United States Patent
Arai

(10) Patent No.: US 10,821,564 B2
(45) Date of Patent: Nov. 3, 2020

(54) CYLINDER DEVICE, PRESS MACHINE, WORKPIECE CLAMPING APPARATUS, CYLINDER DEVICE ACTUATING METHOD, METHOD FOR CLAMPING WORKPIECE, AND METHOD FOR PRESSING WORKPIECE

(71) Applicant: Seiko Instruments Inc., Chiba (JP)

(72) Inventor: Shigehiro Arai, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 213 days.

(21) Appl. No.: 15/919,732

(22) Filed: Mar. 13, 2018

(65) Prior Publication Data

US 2018/0264603 A1 Sep. 20, 2018

(30) Foreign Application Priority Data

Mar. 15, 2017 (JP) .................................. 2017-049309
Feb. 9, 2018 (JP) .................................. 2018-021724

(51) Int. Cl.
  *B23P 19/027* (2006.01)
  *F15B 3/00* (2006.01)
  (Continued)

(52) U.S. Cl.
  CPC .............. *B23P 19/027* (2013.01); *B30B 1/00* (2013.01); *F15B 3/00* (2013.01); *F15B 11/022* (2013.01);
  (Continued)

(58) Field of Classification Search
  CPC .. B23P 19/027; B30B 1/00; F15B 3/00; F15B 11/022; F15B 11/0725; F15B 15/1409; F15B 2211/775
  See application file for complete search history.

(56) References Cited

U.S. PATENT DOCUMENTS 3,511,048 A * 5/1970 Nemetz ............... F15B 11/0325
                                                        60/565
2005/0121846 A1* 6/2005 Kawakami ............ B23B 31/402
                                                        269/309

(Continued)

FOREIGN PATENT DOCUMENTS

JP             4895342 B2      3/2012

*Primary Examiner* — David P Bryant
*Assistant Examiner* — Nirvana Deonauth
(74) *Attorney, Agent, or Firm* — Brinks Gilson & Lione

(57) ABSTRACT

A pneumatic chamber 20 is configured to include a first pneumatic chamber 21 pressurizing a first piston 11 and a second pneumatic chamber 22 pressurizing a second piston 12. The first pneumatic chamber 21 communicates with the second pneumatic chamber 22. The hydraulic pressure generating unit 55 is internally provided with a hydraulic chamber 30, and the hydraulic chamber 30 is configured to have a first hydraulic chamber 31 pressurized by the first pneumatic chamber 21 via the first piston 11 and a second hydraulic chamber 32 pressurized by the second pneumatic chamber 22 via the second piston 12. The hydraulic pressure generating unit 55 is movable in a thrust direction in a cylinder 2, and the second hydraulic chamber 32 has a function of fixing the moving hydraulic pressure generating unit 55 in the cylinder 2 by causing a thin portion 15 to be elastically deformed in a radial direction due to hydraulic pressure. The first hydraulic chamber 31 outputs hydraulic pressure of the first hydraulic chamber 31, which is increased by the fixing, to an output rod 7.

25 Claims, 10 Drawing Sheets

(51) Int. Cl.
*B30B 1/00* (2006.01)
*F15B 15/14* (2006.01)
*F15B 11/02* (2006.01)
*F15B 11/072* (2006.01)

(52) U.S. Cl.
CPC ...... *F15B 11/0725* (2013.01); *F15B 15/1409* (2013.01); *F15B 2211/775* (2013.01)

(56) References Cited

U.S. PATENT DOCUMENTS

2010/0308524 A1* 12/2010 Kitaura ................ B23Q 1/0081
  269/309
2014/0138890 A1* 5/2014 Kawakami .............. B25B 5/062
  269/27

* cited by examiner

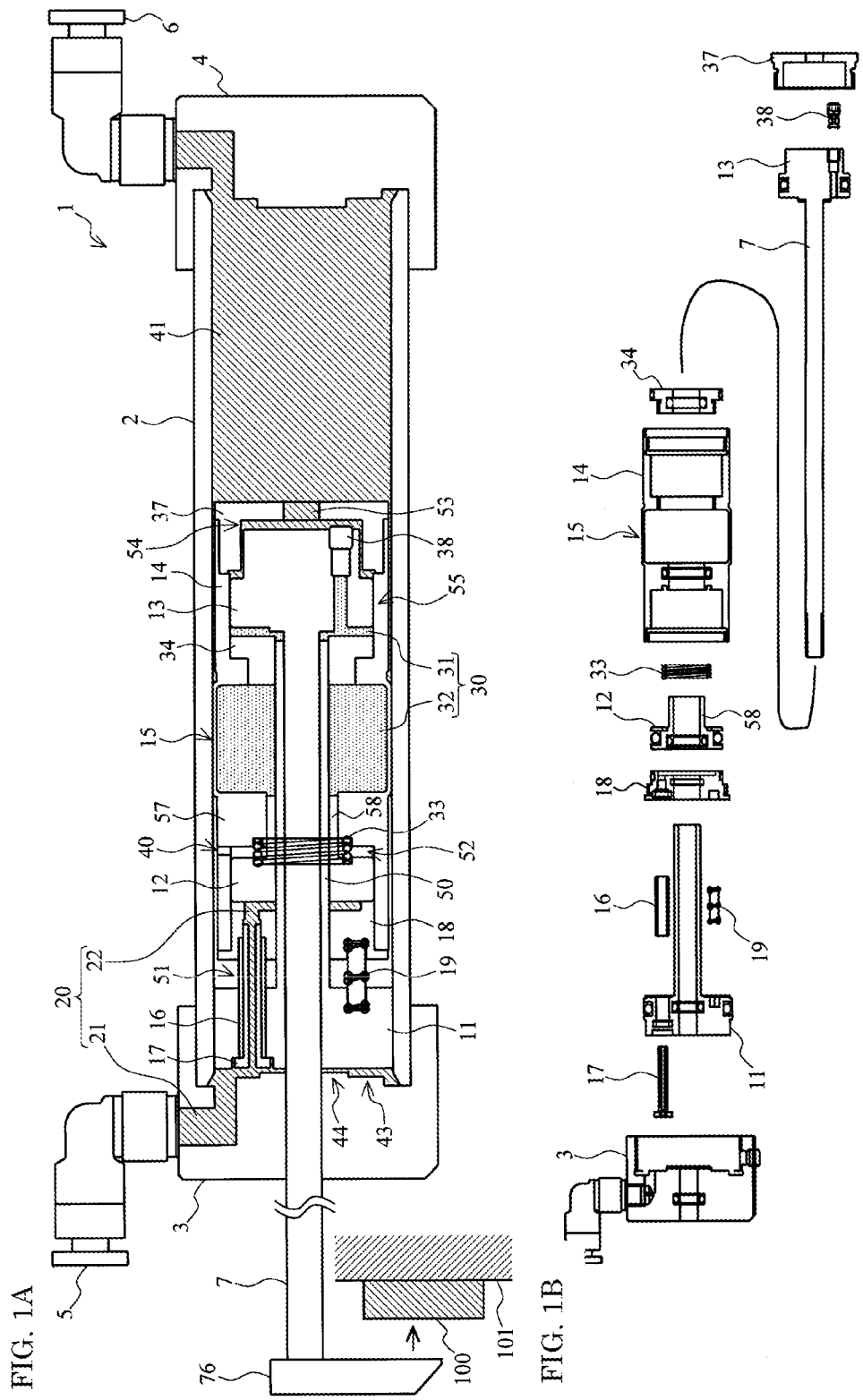

(1)RETREATING (2)AIR DRIVE (3)HYDRAULIC DRIVE (4)AIR DRIVE

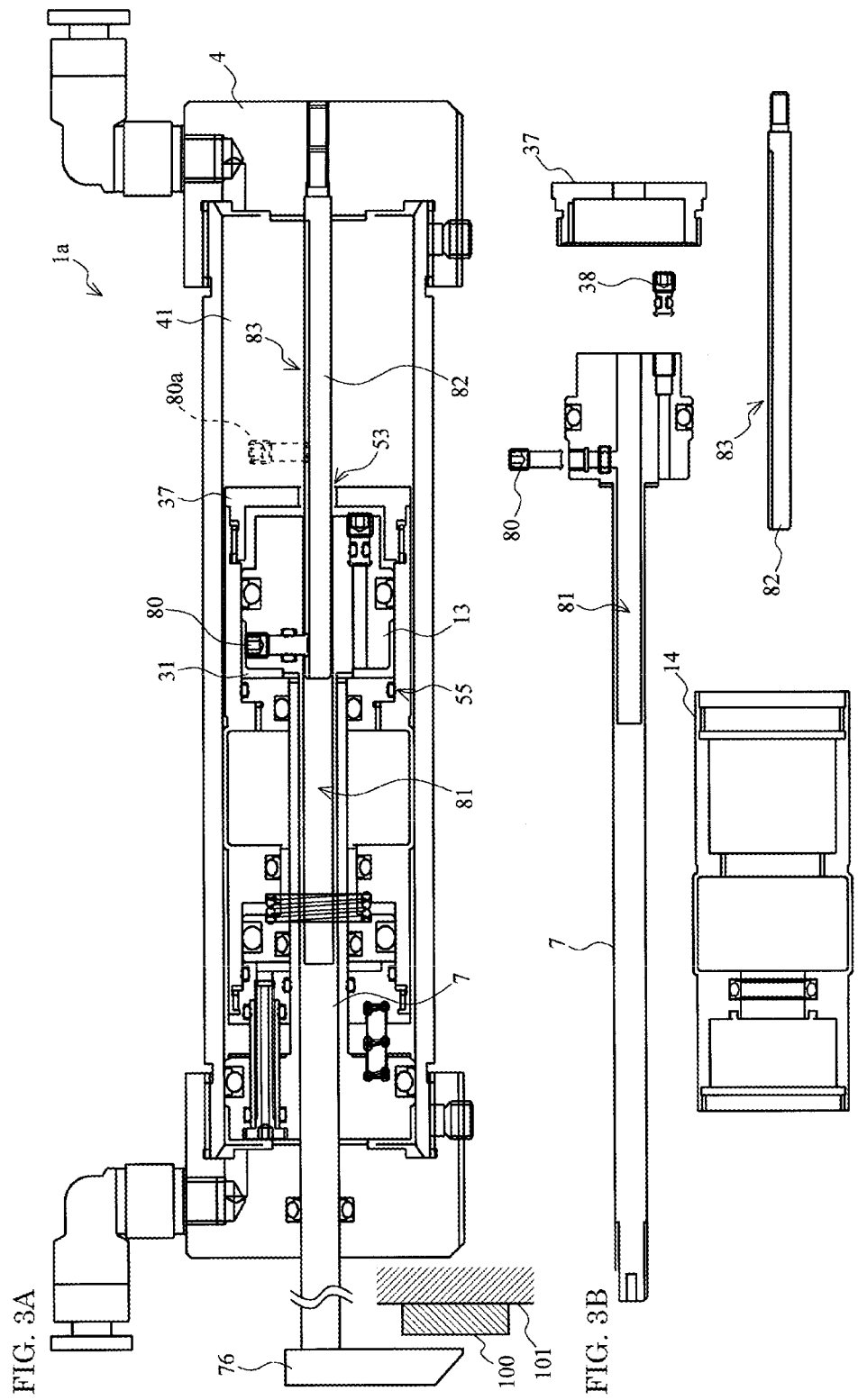

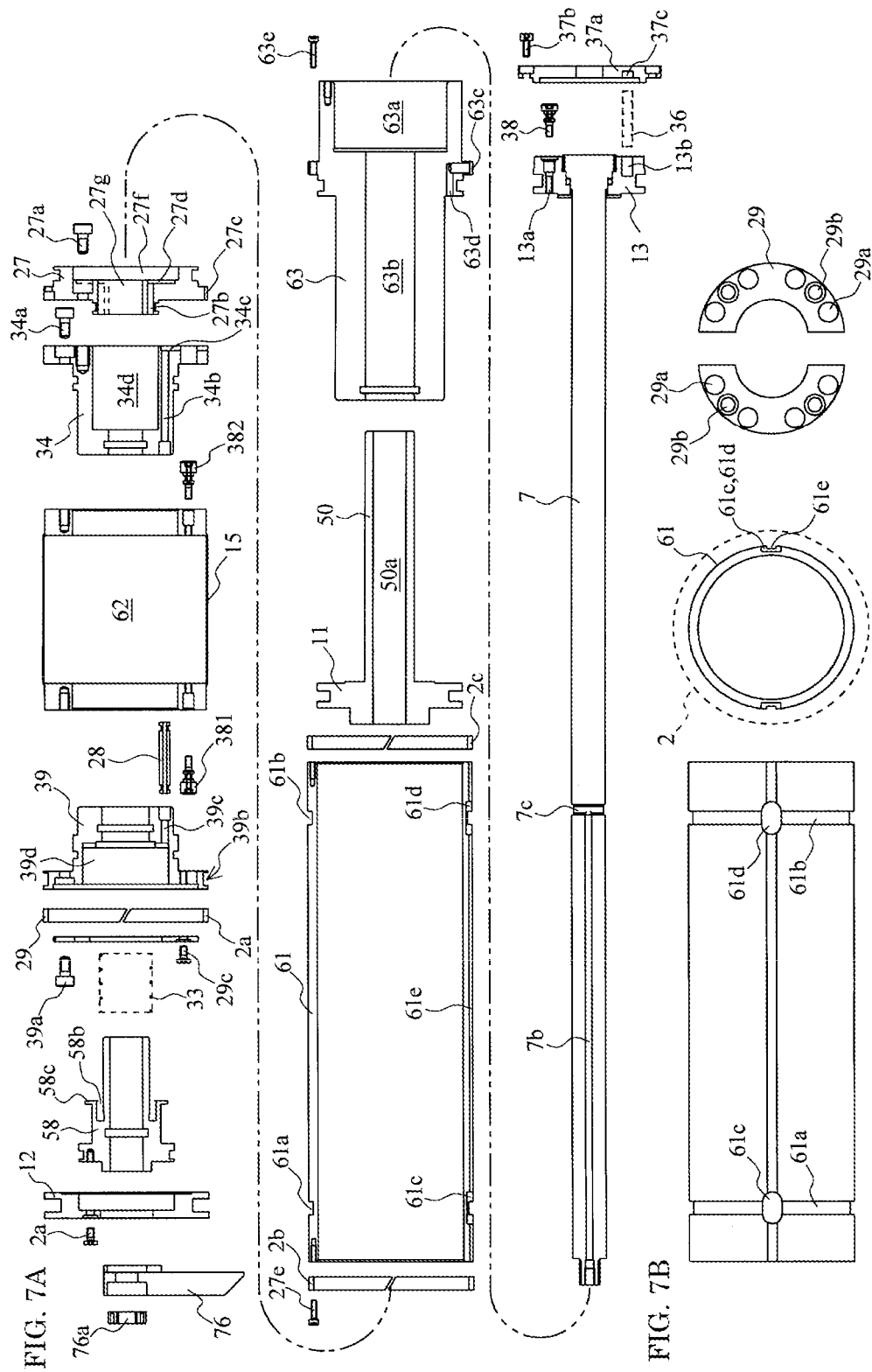

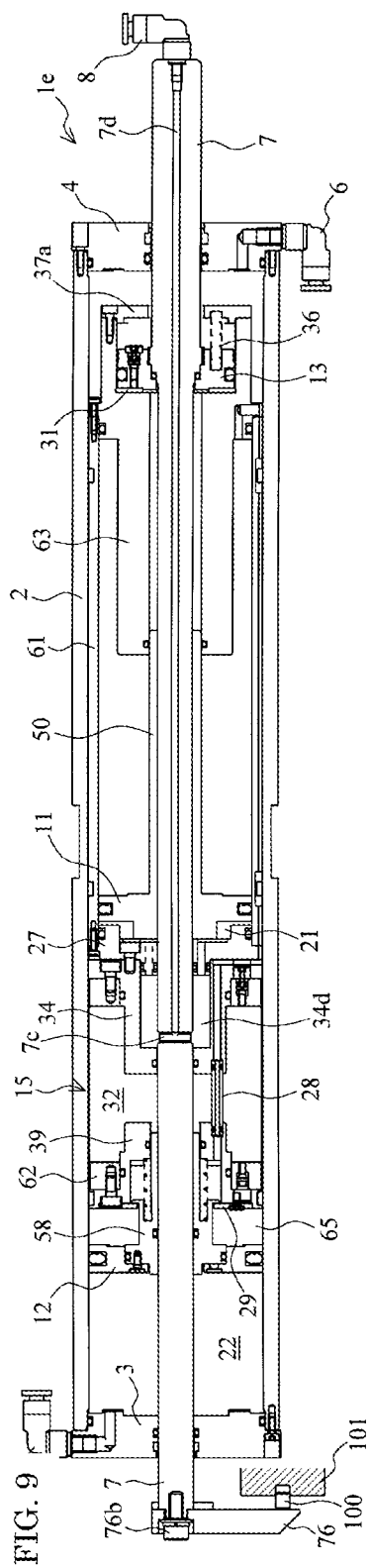

US 10,821,564 B2

CYLINDER DEVICE, PRESS MACHINE, WORKPIECE CLAMPING APPARATUS, CYLINDER DEVICE ACTUATING METHOD, METHOD FOR CLAMPING WORKPIECE, AND METHOD FOR PRESSING WORKPIECE

RELATED APPLICATIONS

This application claims priority under 35 U.S.C. § 119 to Japanese Patent Application Nos. 2017-049309 filed Mar. 15, 2017 and 2018-021724 filed Feb. 9, 2018, the entire content of which are hereby incorporated by reference.

BACKGROUND OF THE INVENTION

Field of the Invention

The present invention relates to a cylinder device, a press machine, a workpiece clamping apparatus, a cylinder device actuating method, a method for clamping workpiece, and a method for pressing workpiece, such as a technology in which a fluid pressure cylinder is used.

Background Art

A fluid pressure cylinder using a fluid such as air (a gas) or oil (a liquid) is used in many industrial fields.

The fluid pressure cylinder generates thrust on a piston in a cylinder due to pressure of a fluid such that the thrust can be a drive force of various types of mechanical actuation such as driving of a press or an actuator.

However, a hydraulic cylinder has a characteristic in that even a small hydraulic cylinder generates large thrust due to a high pressure force by hydraulic pressure; however, a problem arises in that large-scale equipment such as a hydraulic pressure supply device is required.

Therefore, Japanese Patent No. 4895342 proposes a fluid pressure cylinder that generates hydraulic pressure with air pressure by an air hydraulic cylinder obtained by combining an air cylinder and a hydraulic cylinder such that a complex hydraulic system is omitted and the fluid pressure cylinder can be decreased in costs and size.

However, in a technology in Japanese Patent No. 4895342, the thrust is generated by a movement distance of a piston of the air cylinder with a sectional area of the hydraulic cylinder, and thus a problem of a short stroke arises.

For example, in a case where an actuator is disposed on an output side of the air hydraulic cylinder, it is necessary to cause the actuator to move along with air hydraulic cylinder in order to secure a stroke.

SUMMARY OF THE INVENTION

According to an aspect of the invention, an object thereof is to provide a cylinder device having a long stroke by using an air hydraulic cylinder.

According to a first aspect of the invention, in order to achieve the object described above, there is provided a cylinder device including: a cylinder; a pneumatic chamber formed on one end side in the cylinder; a hydraulic chamber that moves to the other end side in the cylinder due to pressure of the pneumatic chamber; fixing means for generating a force in a radial direction from a force in a thrust direction, which is applied to the hydraulic chamber by the pneumatic chamber, and fixing the hydraulic chamber in the cylinder due to the force in the radial direction; hydraulic pressure amplifying means that is provided on the other end side of the pneumatic chamber and amplifies hydraulic pressure that is generated in the fixed hydraulic chamber by the pneumatic chamber; and an output rod that extends to the outside of the cylinder on the one end side and outputs the amplified hydraulic chamber to the one end side by penetrating through the hydraulic pressure amplifying means and the pneumatic chamber.

According to a second aspect of the invention, in the cylinder device of the first aspect, the hydraulic chamber may generate hydraulic pressure by receiving a force in a direction to the other end side, which is applied to the hydraulic chamber by the pneumatic chamber, and a force in a direction to the one end side, which is applied to the hydraulic chamber by the output rod.

According to a third aspect of the invention, in the cylinder device of the first or second aspect, the hydraulic chamber may be configured to include a first hydraulic chamber provided with the output rod and a second hydraulic chamber provided with the fixing means, the fixing means may fix the second hydraulic chamber and the first hydraulic chamber by generating the force in the radial direction due to hydraulic pressure of the second hydraulic chamber, and the hydraulic pressure amplifying means may amplify hydraulic pressure generated in the first hydraulic chamber and may output the hydraulic pressure to the output rod.

According to a fourth aspect of the invention, in the cylinder device of the third aspect, the fixing means may fix the second hydraulic chamber and the first hydraulic chamber by pressing, to an inner wall of the cylinder, a side wall of the second hydraulic chamber that is elastically deformed due to the force in the radial direction.

According to a fifth aspect of the invention, in the cylinder device of the third aspect, the fixing means may generate the force in a radial direction by pressing, to a clamper, a taper member moving in a thrust direction, due to the hydraulic pressure generated in the second hydraulic chamber, and may fix the second hydraulic chamber and the first hydraulic chamber by pressing the clamper to an inner wall of the cylinder by the force.

According to a sixth aspect of the invention, in the cylinder device of the third, fourth, or fifth aspect, the first hydraulic chamber may have an output piston pressing the output rod in an output direction.

According to a seventh aspect of the invention, in the cylinder device of the sixth aspect, the output piston of the first hydraulic chamber may transmit only an output to the output rod without moving even in a state in which hydraulic pressure generated by being amplified in the first hydraulic chamber is applied to the output rod and thrust is output.

According to an eighth aspect of the invention, in the cylinder device of any one of the third to seventh aspects, the pneumatic chamber may be configured to include a first pneumatic chamber having a first piston that pressurizes the first hydraulic chamber, a second pneumatic chamber having a second piston that pressurizes the second hydraulic chamber, and a communication hole through which the first pneumatic chamber communicates with the second pneumatic chamber. The first pneumatic chamber may have a first inlet/outlet and may be formed on the one end side of the second pneumatic chamber.

According to a ninth aspect of the invention, in the cylinder device of the eighth aspect, the first piston may cause the second pneumatic chamber, the first hydraulic chamber, and the second hydraulic chamber to move to the other end side until the output rod abuts on a pressing target or until the first hydraulic chamber reaches an end portion on the other end side to which the first hydraulic chamber is movable, with pressure of the first pneumatic chamber.

According to a tenth aspect of the invention, in the cylinder device of the ninth aspect, a movement distance of the second piston measured when the second piston of the second hydraulic chamber generates hydraulic pressure amplified in the second hydraulic chamber may be within a range of a length of elastic deformation of a seal member of the second hydraulic chamber, which is disposed in the second piston.

According to an eleventh aspect of the invention, in the cylinder device of the ninth or tenth aspect, the first pneumatic chamber may be provided with a first inlet/outlet, and the first pneumatic chamber may communicate with the second pneumatic chamber through a communication hole.

According to a twelfth aspect of the invention, in the cylinder device of the ninth, tenth, or eleventh aspect, the first hydraulic chamber may be formed on the other end side of the second hydraulic chamber, and the first piston may be formed up to the first hydraulic chamber by penetrating through the second pneumatic chamber and the second hydraulic chamber.

According to a thirteenth aspect of the invention, the cylinder device of the eleventh or twelfth aspect may further include: a third pneumatic chamber that is provided on the other end side in the cylinder, has a second inlet/outlet, and presses the hydraulic chamber to the one end side.

According to a fourteenth aspect of the invention, the cylinder device of any one of the first to thirteenth aspects may further include: rotation angle changing means for changing a rotation angle of the output rod around the central axis during movement of the output rod.

According to a fifteenth aspect of the invention, in the cylinder device of the fourteenth aspect, the rotation angle changing means may change the rotation angle of the output rod by using a sliding mechanism of the output rod, a protruding member formed on one side, and a groove that is formed on the other side, engages with the protruding member, and is formed in a moving direction of the output rod, of a sliding surface opposite to the output rod.

According to a sixteenth aspect of the invention, there is provided a press machine including: the cylinder device according to the eleventh aspect; workpiece mounting means for mounting a workpiece at a predetermined position with respect to the cylinder device; press means for pressing the mounted workpiece with a tool disposed on the output rod by driving the cylinder device; and detachment means for detaching the pressed workpiece from the predetermined position.

According to a seventeenth aspect of the invention, there is provided a workpiece clamping apparatus including: the cylinder device according to the thirteenth aspect; workpiece mounting means for mounting a workpiece at a predetermined position with respect to the cylinder device; means for pressing and clamping the mounted workpiece with a tool disposed on the output rod by driving the cylinder device; and detachment means for detaching the clamped workpiece from the predetermined position.

According to an eighteenth aspect of the invention, there is provided a cylinder device actuating method for actuating the cylinder device according to the thirteenth aspect, the method including: a first step of setting an initial state by causing the first hydraulic chamber and the second hydraulic chamber to move to the one end side by pressurizing the third pneumatic chamber from the second inlet/outlet and depressurizing the first pneumatic chamber and the second pneumatic chamber from the first inlet/outlet; a second step of causing the output rod to abut on a pressing target or causing the first hydraulic chamber to reach the end portion on the other end side to which the first hydraulic chamber is movable by causing the first pneumatic chamber and the second pneumatic chamber to move to the other end side by pressurizing the first pneumatic chamber and the second pneumatic chamber from the first inlet/outlet and depressurizing the third pneumatic chamber from the second inlet/outlet; a third step of actuating the fixing means by further performing pressurization from the first inlet/outlet and fixing the first hydraulic chamber and the second hydraulic chamber to the cylinder; a fourth step of actuating the hydraulic pressure amplifying means by further performing pressurization from the first inlet/outlet and pressing the output rod to the pressing target; and a fifth step of returning to an initial state by causing the first hydraulic chamber and the second hydraulic chamber to move to the one end side by pressurizing the third pneumatic chamber from the second inlet/outlet and depressurizing the first pneumatic chamber and the second pneumatic chamber from the first inlet/outlet.

According to a nineteenth aspect of the invention, there is provided a method for clamping a workpiece at a predetermined position by actuating the cylinder device according to the thirteenth aspect, the method including: a first step of mounting the workpiece at the predetermined position; a second step of driving the cylinder device and causing the cylinder device to move due to the pneumatic pressure of the first pneumatic chamber, until a tool disposed on the output rod abuts and stops on the workpiece or until the first hydraulic chamber reaches and stops on the end portion on the other end side to which the first hydraulic chamber is movable; a third step of fixing the first hydraulic chamber and the second hydraulic chamber by the fixing means; a fourth step of amplifying hydraulic pressure of the first hydraulic chamber by the hydraulic pressure amplifying means; and a fifth step of clamping the workpiece at a predetermined position by pressing the workpiece due to hydraulic pressure with the tool disposed on the output rod due to the hydraulic pressure amplified in the fourth step.

According to a twentieth aspect of the invention, there is provided a method for pressing a workpiece by actuating the press machine according to the sixteenth aspect, the method including: a first step of driving the cylinder device and returning a position of the output rod to an initial state; a second step of mounting the workpiece at a predetermined position; a third step of driving the cylinder device and causing the cylinder device to move due to the pressure of the first pneumatic chamber, until a tool disposed on the output rod abuts and stops on the workpiece or until the first hydraulic chamber reaches and stops on the end portion on the other end side to which the first hydraulic chamber is movable; a fourth step of fixing the first hydraulic chamber and the second hydraulic chamber by the fixing means; a fifth step of amplifying hydraulic pressure of the first hydraulic chamber by the hydraulic pressure amplifying means; a sixth step of pressing the workpiece due to hydraulic pressure with a tool disposed on the output rod, due to the hydraulic pressure amplified in the fifth step, and pressing the workpiece; a seventh step of driving the cylinder device and detaching the output rod and the tool disposed on the output rod from the workpiece by pneumatic pressure; and an eighth step of detaching the completely pressed workpiece from the predetermined position.

According to a twenty-first aspect of the invention, in the cylinder device of any one of the third to seventh aspects, the pneumatic chamber may be configured to include the first pneumatic chamber having the first piston that pressurizes the first hydraulic chamber and the second pneumatic chamber having the second piston that pressurizes the second hydraulic chamber. The second pneumatic chamber may be disposed on the one end side of the second hydraulic chamber, and the first pneumatic chamber may be disposed on the other end side of the second hydraulic chamber. The cylinder device may further include: a first inlet/outlet for pressurizing the second pneumatic chamber; and a third inlet/outlet for pressurizing the first pneumatic chamber by penetrating through the second pneumatic chamber and the second hydraulic chamber.

According to a twenty-second aspect of the invention, in the cylinder device of the twenty-first aspect, the output rod may penetrate through the second pneumatic chamber and the second hydraulic chamber to the outside of the cylinder on the one end side, and the third inlet/outlet may pressurize the first pneumatic chamber through a part in the output rod from one end side of the output rod.

According to a twenty-third aspect of the invention, in the cylinder device of the twenty-first aspect, the output rod may penetrate through the cylinder in the entire length thereof from the outside thereof on the one end side to the outside thereof on the other end side, and the third inlet/outlet may pressurize the first pneumatic chamber through a part in the output rod from the other end side of the output rod.

According to a twenty-fourth aspect of the invention, the cylinder device of the twenty-first, twenty-second, or twenty-third aspect may further include an input-side housing provided with the second hydraulic chamber; and an output-side housing provided with the first pneumatic chamber and the first hydraulic chamber, and the input-side housing may be fixed to the one end side of the output-side housing.

According to a twenty-fifth aspect of the invention, in the cylinder device of the twenty-fourth aspect, the second piston may be disposed between the input-side housing and the second pneumatic chamber, may make movement to the other end side due to pressure from the second pneumatic chamber, and may have a rod portion that pressurizes the second hydraulic chamber due to the movement.

According to a twenty-sixth aspect of the invention, there is provided a cylinder device actuating method for actuating the cylinder device according to the twenty-fifth aspect, the method including: a moving step of causing the second piston, the input-side housing, and the output-side housing to move to the other end side by pressurizing the second pneumatic chamber from the first inlet/outlet; a movement stopping step of stopping the movement of the input-side housing and the output-side housing by causing the output rod to abut on a pressing target; a fixing step of actuating the fixing means by further pressurizing the second hydraulic chamber from the first inlet/outlet so as to cause the second piston to move to the other end side such that the rod portion pressurizes the second hydraulic chamber and fixing the input-side housing and the output-side housing to the cylinder; and a thrust generating step of actuating the hydraulic pressure amplifying means by pressurizing the first pneumatic chamber from the third inlet/outlet after the fixing and generating thrust due to the hydraulic pressure amplified from the front end of the output rod.

According to the invention, the movement of the hydraulic chamber in the cylinder by the pneumatic chamber enables both of the stroke and the thrust to be secured.

BRIEF DESCRIPTION OF THE DRAWINGS

FIGS. 1A and 1B are views for illustrating a cylinder device of a first embodiment.

FIGS. 3A and 3B are views for illustrating a cylinder device of a second embodiment.

FIGS. 7A and 7B are views of parts of the fifth embodiment.

FIG. 9 is a view for illustrating a cylinder device of a sixth embodiment.

DETAILED DESCRIPTION OF THE INVENTION

Outline of First Embodiment

Figure 2A:
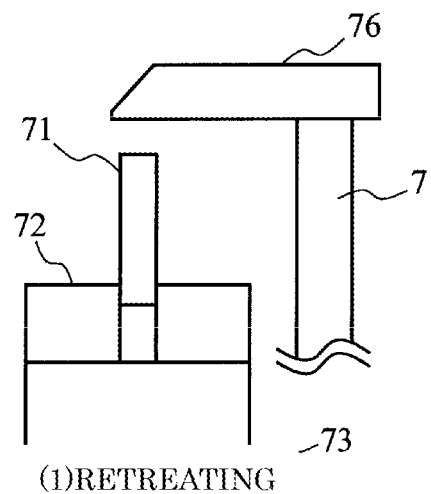
FIGS. 2A to 2D are views for illustrating press working.
Figure 2B:
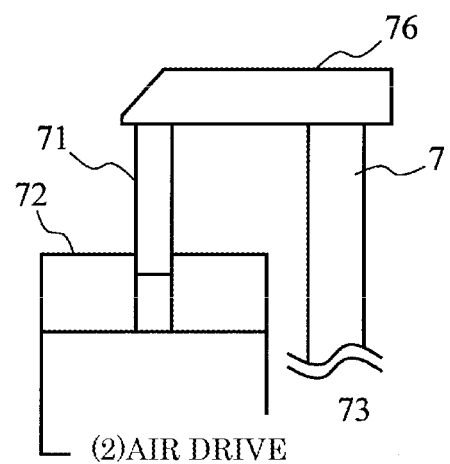
Figure 2C:
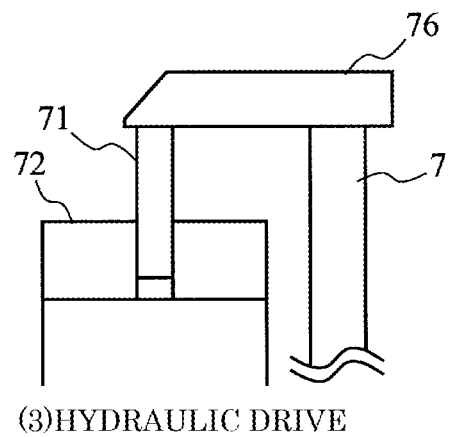
Figure 2D:
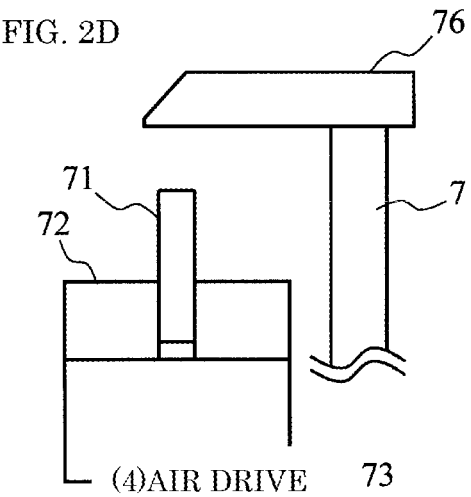

An air hydraulic cylinder in the related art is characterized in that an air cylinder unit has a long stroke and low thrust and a hydraulic cylinder unit has a short stroke and high thrust.

By comparison, in a cylinder device 1 (FIG. 1A) of the embodiment, a pneumatic system configured of a pneumatic chamber 20 has a function of causing a hydraulic system configured of a hydraulic chamber 30 to move in a thrust direction in a cylinder 2 and a function of generating hydraulic pressure by pressurizing the hydraulic chamber 30 after the moving. In this manner, a necessary stroke is secured and necessary thrust is generated.

More specifically, the pneumatic chamber 20 is configured to include a first pneumatic chamber 21 pressurizing a first piston 11 and a second pneumatic chamber 22 pressurizing a second piston 12.

The first pneumatic chamber 21 and the second pneumatic chamber 22 are in communication with each other through a through-hole formed inside a retaining bolt 17.

On the other hand, a hydraulic pressure generating unit 55 is internally provided with the hydraulic chamber 30, and the hydraulic chamber 30 is configured to have a first hydraulic chamber 31 pressurized by the first pneumatic chamber 21 via the first piston 11 and a second hydraulic chamber 32 pressurized by the second pneumatic chamber 22 via the second piston 12.

The hydraulic pressure generating unit 55 is movable in a thrust direction in the cylinder 2, and the second hydraulic chamber 32 has a function of fixing the moving hydraulic pressure generating unit 55 in the cylinder 2 by causing a thin portion 15 to be elastically deformed in a radial direction due to hydraulic pressure.

The first hydraulic chamber 31 outputs hydraulic pressure of the first hydraulic chamber 31, which is increased by the fixing, to an output rod 7.

Actuation of the cylinder device 1 is as follows.

First, a first inlet/outlet 5 is opened and the air is injected from a second inlet/outlet 6, and the hydraulic pressure generating unit 55 is positioned near the side of the first inlet/outlet 5 and is set in an initial state.

Next, the second inlet/outlet 6 is opened and the air is injected from the first inlet/outlet 5.

In this manner, the first pneumatic chamber 21 is pressurized and the first piston 11 is pushed such that the hydraulic pressure generating unit 55 moves to the side of the second inlet/outlet 6. In this manner, a sufficient stroke of the output rod 7 is achieved.

When the output rod 7 abuts on a workpiece 100 via a tool such as a claw 76, the movement of the hydraulic pressure generating unit 55 is stopped. The second hydraulic chamber 32 inside the hydraulic pressure generating unit 55 has a configuration in which a lid 34 serves as an inner wall thereof on the output side and has a structure in which oil therein is sandwiched between the lid and the second piston 12 of the second pneumatic chamber 22.

Seal members used in the first piston 11 and the second piston 12 are made of different materials and the seal member of the second piston 12 has low sliding resistance such that faster actuation of the second piston is started and the faster actuation is completed. A difference in sliding resistance of the seal members between the first piston 11 and the second piston 12 is based on a difference in friction resistance due to a difference between the materials; however, the difference may be based on a difference in shape or interference.

When the movement of the hydraulic pressure generating unit 55 is stopped and movement of the lid 34 as an internal partition wall is stopped, the second hydraulic chamber is pressed by the second piston 12 from the input side, and thus an internal pressure increases. Similarly, the first hydraulic chamber 31 inside the hydraulic pressure generating unit 55 is sandwiched between the output rod 7 and the first piston 11 of the first pneumatic chamber 21. Hence, when the movement is stopped by the output rod 7 on the output side, the first hydraulic chamber is pressed by the first piston 11 from the input side, and thus an internal pressure increases.

At this time, since the second piston 12 having the low sliding resistance moves faster, the thin portion 15 is first elastically deformed due to the hydraulic pressure by the second hydraulic chamber 32 and abuts on an inner circumferential surface of the cylinder 2, and the hydraulic pressure generating unit 55 is fixed to the cylinder 2 due to friction.

When the hydraulic pressure generating unit 55 is fixed thereto, the first piston 11 and the second piston 12 further pressurize the first hydraulic chamber 31 and the second hydraulic chamber 32 with air supplied from the first inlet/outlet 5.

In this manner, the hydraulic pressure increased in the second hydraulic chamber 32 further presses the thin portion 15 to the inner circumferential surface of the cylinder 2, and the fixing is more firmly performed. When the hydraulic pressure generating unit 55 is fixed to the cylinder 2, the thrust that causes a third piston 13 to move forward due to the hydraulic pressure of the first hydraulic chamber 31 is increased. Therefore, the more increased hydraulic pressure of the first hydraulic chamber 31 is output to the output rod 7 via the third piston 13 and large thrust is applied to the workpiece 100 due to the hydraulic pressure.

As described above, the cylinder device 1 achieves both of the long stroke by an air cylinder and high hydraulic pressure by a hydraulic cylinder.

Details of First Embodiment

FIG. 1A is a sectional view in a thrust direction (direction of the centerline) of the cylinder device 1 according to the first embodiment, and FIG. 1B is a view of parts.

In FIG. 1A, an O-ring is omitted for avoiding complicatedness of the figure. The omitted O-ring is disposed between members by which a space is formed and is sealed to contain a fluid such as air or oil. In this manner, the O-ring is provided to seal the space and to prevent leakage of the fluid, and thus, the O-ring is illustrated in the view of parts in FIG. 1B.

The cylinder device 1 is configured to block both opened ends of the cylinder 2 with lids 3 and 4 and accommodates (is internally provided with) the hydraulic pressure generating unit 55 that moves in the thrust direction by the first piston 11 of the first pneumatic chamber 21.

The hydraulic pressure generating unit 55 is an assembly having a hydraulic pressure generating function by being configured to include the second pneumatic chamber 22, the second hydraulic chamber 32, the first hydraulic chamber 31, and the like which are accommodated inside a piston housing 14 as a housing.

The hydraulic pressure generating unit 55 moves to the output side (side of the second inlet/outlet 6) due to the pressure of the first pneumatic chamber 21. The second hydraulic chamber 32 fixes, in the cylinder 2, the hydraulic pressure generating unit 55 moving due to the hydraulic pressure, and the first hydraulic chamber 31 outputs hydraulic pressure increased therein by being fixed, as the thrust in one direction of the output rod 7.

The output rod 7 extends to the outside of the lid 3 on the input side (side of the first inlet/outlet 5) by penetrating through the second hydraulic chamber 32, the second pneumatic chamber 22, and the first pneumatic chamber 21, that is, extends to the outside of the cylinder 2 on the one end side. In addition, the output rod 7 pulls the claw 76 provided on the front end thereof to the side of the cylinder device 1, thereby pressing the workpiece 100 to the workpiece mounting stand 101 on the one end side of the cylinder 2.

As described above, the cylinder device 1 is provided with a hydraulic chamber that moves to the other end side (output side) due to the pressure of a pneumatic chamber in the cylinder, and the hydraulic chamber is configured to include the first hydraulic chamber 31 in which the output rod 7 is provided and the second hydraulic chamber 32 in which fixing means is provided.

A material of parts that configure the cylinder device 1 is metal such as aluminum, stainless steel, or iron.

As an example of the size of the cylinder device 1, an outer diameter is about 20 mm and a stroke length is about 50 mm; however, the size may be larger or smaller than those described above. As described above, the outline of the configuration of the cylinder device 1 is described.

Hereinafter, the one end side, on which the first inlet/outlet 5 is formed, is referred to as an input side because pressurizing air is input on the side, and the other end side, on which the second inlet/outlet 6 is formed, is referred to as the output side because the hydraulic pressure is output on the side. Therefore, the output rod 7 is formed on the input side.

In addition, a state illustrated in FIG. 1A in which the parts in the cylinder 2 are positioned on the input-most side is referred to as the initial state.

The cylinder 2 is a circular cylindrical member with both ends opened and configures a housing of the cylinder device 1.

The end portion of the cylinder 2 on the input side is blocked with the lid 3 configured of a circular column-shaped member.

On the output side of the lid 3, a recessed portion 43, into which the cylinder 2 is inserted, is formed, and a male screw formed on the outer circumference of the end portion of the cylinder 2 on the input side is fitted in female threads formed in an inner circumferential surface of the recessed portion 43. In this manner, the cylinder 2 and the lid 3 are screwed and joined to each other.

In addition, the lid 3 has, on the centerline, a through-hole for insertion and extension of the output rod 7 to the outside of the lid 3.

In a portion of the end portion in the cylinder 2 on the input side, the first piston 11 sliding in the thrust direction along the inner wall of the cylinder 2 is provided.

The end surface of the first piston 11 on the input side is opposite to the bottom surface of the recessed portion 43, and a projecting portion 44 provided with a groove is formed on the bottom surface of the recessed portion 43.

Since the projecting portion 44 restricts a movement range of the first piston 11 to the input side, a space is formed by being surrounded by the recessed portion 43, the end surface of the first piston 11, and the inner wall of the cylinder 2, even in a case where the first piston 11 is positioned near the input-most side.

A side surface of the lid 3 is provided with an inlet/outlet channel that communicates with the space from the first inlet/outlet 5. In this manner, the first pneumatic chamber 21 that can be pressurized and depressurized by intake or exhaust from the first inlet/outlet 5 is formed in the space.

The groove is formed in the projecting portion 44 such that air is rapidly spread all across the end surface of the first piston 11 in a case where the air is supplied from the first inlet/outlet 5.

The end surface of the first piston 11 on the output side is provided with a rod portion 50 that reaches the first hydraulic chamber 31 in the thrust direction by penetrating through a retaining nut 18 to be described below, the second pneumatic chamber 22, the second piston 12, a protruding portion 57, the second hydraulic chamber 32, and the lid 34 along the centerline.

The rod portion 50 is formed to have a circular cylindrical shape and has a through-hole penetrating through the first piston 11 along the centerline thereof, into which the output rod 7 is slidably inserted.

As described above, the first hydraulic chamber 31 is formed on the other end side (output side) of the second hydraulic chamber 32, and the first piston 11 is formed up to the first hydraulic chamber 31 by penetrating through the second pneumatic chamber 22 and the second hydraulic chamber 32.

The first piston 11 has a function of causing the hydraulic pressure generating unit 55 to move to the output side in the cylinder 2 and a function of pressurizing the first hydraulic chamber 31 and outputting the hydraulic pressure to the output rod 7.

The hydraulic pressure generating unit 55 is disposed on the output side of the first piston 11.

The hydraulic pressure generating unit 55 is a hydraulic pressure generating assembly that includes the piston housing 14 having a substantially circular cylinder shape and generates the hydraulic pressure by driving the second pneumatic chamber 22, the second hydraulic chamber 32, and the first hydraulic chamber 31 which are formed in the housing.

The piston housing 14 is a member having a substantially circular cylinder shape with an inner shape in which the second pneumatic chamber 22, the second hydraulic chamber 32, and the first hydraulic chamber 31 are formed from the input side.

At the center of the piston housing 14, the thin portion 15 that slides in the cylinder 2 with a predetermined clearance from the inner circumferential surface of the cylinder 2 is formed on an outer circumferential portion. Opposing end portions of the thin portion 15 are formed to have an outer diameter smaller than that of the thin portion 15.

The retaining nut 18 that blocks an opening of the piston housing 14 is screwed and fixed to the end portion of the piston housing 14 on the input side, by fitting a male screw formed on the retaining nut 18 in female threads formed on the piston housing 14.

A coil spring 19 is provided between the first piston 11 and the retaining nut 18 and biases the first piston and the retaining nut in a direction in which the first piston and the retaining nut are separated from each other.

The coil spring 19 is disposed in a recessed portion formed at a position corresponding to the end surface of the first piston 11 on the output side and the end surface of the retaining nut 18 on the input side.

In addition, the first piston 11 is provided with a through-hole for insertion of the retaining bolt 17, and the retaining nut 18 is provided with a penetrating screw hole for fixing the retaining bolt 17.

A portion of the penetrating screw hole of the retaining nut 18 on the input side is subjected to counterbore machining, and a collar 16 that is a circular cylindrical member is inserted from the through-hole to the portion subjected to the counterbore machining of the first piston 11.

The retaining bolt 17 is inserted into the collar 16, and the front end of the retaining bolt 17 is fitted and screwed in the female threads formed on the retaining nut 18.

In addition, a portion of the through-hole of the first piston 11 on the input side is subjected to the counterbore machining, the head portion of the retaining bolt 17 abuts on the corresponding counterbore portion, and thereby the first piston 11 is prevented from slipping out.

Although not illustrated, an O-ring is provided between the outer circumferential surface of the collar 16 and the inner circumferential surface of the through-hole of the first piston 11 such that the first piston 11 is slidable with respect to the collar 16 in the thrust direction.

As described above, the coil spring 19 biases the first piston 11 in a separating direction from the retaining nut 18, and the retaining bolt 17 restricts the maximum separating distance such that the first piston 11 is not separated from the retaining nut 18 by a distance equal to or longer than a predetermined distance.

The maximum separating distance is set to a distance with which a gap 51 for securing a stroke by which the first piston 11 is pushed to the side of the retaining nut 18 is formed between the end surface of the first piston 11 on the output side and the end surface of the retaining nut 18 on the input side.

With such a configuration described above, in the initial state, the coil spring 19 separates the first piston 11 and the retaining nut 18 from each other by the distance restricted by the retaining bolt 17; however, the first piston 11 is capable of approaching the retaining nut 18 when pressure is applied to the first pneumatic chamber 21 such that the hydraulic pressure generating unit 55 is fixed by the second hydraulic chamber, or the hydraulic pressure generating unit 55 abuts on the lid 4 and cannot move.

At this time, the air in the gap 51 is discharged from a through-hole 40 to be described below to the third pneumatic chamber 41 through a space between the outer circumference of the piston housing 14 and the inner circumference of the cylinder 2.

The retaining nut 18 is provided with a recessed portion on the output side, and the second pneumatic chamber 22 is formed by a space formed by the recessed portion and the end surface of the second piston 12 disposed on the output side of the retaining nut 18 in the piston housing 14.

In addition, the retaining nut 18 has, on the centerline, a through-hole into which the rod portion 50 is slidably inserted.

The retaining bolt 17 is provided with a through-hole along the centerline, and the first pneumatic chamber 21 is in communication with the second pneumatic chamber 22 via the through-hole.

As described above, the cylinder device 1 includes the pneumatic chamber (pneumatic chamber 20) formed on the one end side (input side) in the cylinder, and the pneumatic chamber 20 is configured to include the first pneumatic chamber 21 having the first piston 11 that pressurizes the first hydraulic chamber 31 and the second pneumatic chamber 22 having the second piston 12 that pressurizes the second hydraulic chamber 32.

The first pneumatic chamber 21 is formed on the one end side of the second pneumatic chamber 22 and has the first inlet/outlet 5.

Further, the first piston 11 is provided with a communication hole through which the first pneumatic chamber 21 communicates with the second pneumatic chamber 22.

In order to form the second hydraulic chamber 32, the protruding portion 57 protruding from the inner circumferential surface of the cylinder 2 in the centerline direction is formed on the output side of the second piston 12.

A coil spring 33 is disposed between the end surface of the second piston 12 on the output side and the end surface of the protruding portion 57 on the input side and biases the second piston 12 in a separating direction from the protruding portion 57, and the rod portion 50 of the first piston 11, a rod portion 58 of the second piston 12, and the output rod 7 are inserted into the center of the coil spring 33.

With such a configuration described above, in the initial state, the end surface of the second piston 12 on the input side abuts on the front end of an edge of the recessed portion of the retaining nut 18, and a gap 52 for securing a stroke by which the second piston 12 is pushed to the side of the protruding portion 57 is formed between the end surface of the second piston 12 on the output side and the end surface of the protruding portion 57 on the input side.

In addition, a portion of the piston housing 14, in which the gap 52 is formed, is provided with a through-hole 40 through which air in the gap 52 escapes to a space between the piston housing 14 and the cylinder 2 when the second piston 12 moves to the side of the protruding portion 57.

The protruding portion 57 has, on the centerline, a through-hole reaching the second hydraulic chamber 32 and the rod portion 58 of the second piston 12 is slidably inserted into the through-hole.

Further, the rod portion 58 has, on the centerline, a through-hole penetrating through the second piston 12 and the rod portion 50 of the first piston 11 is slidably inserted into the through-hole.

As described above, the rod portion 58 is formed to have a circular cylindrical shape, and an end portion of the rod portion, which penetrates through the protruding portion 57 and is exposed to the second hydraulic chamber 32 has a function of a piston that pressurizes oil in the second hydraulic chamber 32.

Here, when P1 represents pressure of the air in the first pneumatic chamber 21 and the second pneumatic chamber 22, S1 represents a sectional area of the second piston 12 in the second pneumatic chamber 22 (an area obtained by projecting a portion receiving the pressure from air, in the thrust direction, the same in the following description), S2 represents a sectional area of the rod portion 58 in the second hydraulic chamber 32, and F1 represents a force by which the coil spring 33 biases the second piston 12, hydraulic pressure P2 of the second hydraulic chamber 32 is obtained in a relationship of $P2=(P1 \cdot S1-F1)/S2$. Therefore, when an expression of $(P1 \cdot S1-F1)/S2>P1$ is satisfied, the pressure of the second pneumatic chamber 22 is amplified and transmitted to the second hydraulic chamber 32.

The hydraulic pressure generating unit 55 is configured to satisfy such a condition, and the second hydraulic chamber 32 firmly fixes the hydraulic pressure generating unit 55 with the amplified hydraulic pressure.

The second hydraulic chamber 32 is configured to have a space, with the input side thereof partitioned by the protruding portion 57, the outer circumferential portion thereof partitioned by the thin portion 15 of the piston housing 14, and the output side thereof partitioned by the lid 34, and is filled with hydraulic oil.

When the second piston 12 is pressed to the side of the protruding portion 57 by the force in the thrust direction, the rod portion 58 is inserted into the second hydraulic chamber 32, and thus the second hydraulic chamber 32 is pressurized in accordance with the expression described above. In particular, when the output rod 7 abuts on the workpiece 100 (more specifically, the claw 76 attached on the front end of the output rod 7 abuts on the workpiece 100), rapid pressurizing is performed.

When the second piston 12 is pressed to the side of the protruding portion 57 by the force in the thrust direction, the rod portion 58 is inserted into the second hydraulic chamber 32, and thus the second hydraulic chamber 32 is pressurized in accordance with the expression described above. At this time, the pressurized pressure uniformly presses the surrounding inner walls. A sectional area of an inner wall of the second hydraulic chamber 32 in the thrust direction is smaller on the input side than on the output side by a sectional area of the rod portion 58, when the sectional areas on the input side and the output side are compared to each other. Therefore, since the force of the oil inside the second hydraulic chamber 32, which presses the inner wall, is larger on the output side on which the sectional area is larger, a force that causes the second hydraulic chamber 32 to move to the output side is applied to the second hydraulic chamber 32.

At this time, since the air is supplied simultaneously to the first pneumatic chamber 21 and the second pneumatic chamber 22, the second piston 12 and the first piston 11 simultaneously start the actuation. Therefore, hydraulic pressure simultaneously starts to be generated also in the first hydraulic chamber 31. Since the hydraulic pressure generated in the first hydraulic chamber 31 presses the end surface of the lid 34 on the output side, a force is generated to cause the hydraulic pressure generating unit 55 to move to the input side.

In a case where the force of causing movement to the output side by the second hydraulic chamber 32 is larger in a relationship between opposite forces of causing movements to the output side and the input side, the force is applied to the hydraulic pressure generating unit 55 in a direction in which the second hydraulic chamber 32 presses the output rod 7; however, since the output rod 7 cannot move, the hydraulic pressure generating unit 55 also stops at the position.

Thus, the hydraulic pressure increased inside the second hydraulic chamber 32 cannot move in the thrust direction because the output rod 7 stops. Thus, the pressure is applied to the thin portion 15 having weak stiffness, the thin portion is elastically deformed and expands in the radial direction (outward direction from the centerline) represented by arrow lines, and the outer circumferential surface of the thin portion 15 is pressed to the inner circumferential surface of the cylinder 2. In this manner, the frictional force is generated between the thin portion 15 and the cylinder 2, and the hydraulic pressure generating unit 55 is fixed in the cylinder 2 in the thrust direction.

On the other hand, in a case where the force of causing the movement to the input side by the first hydraulic chamber 31 is larger, the second piston 12 has lower sliding resistance due to the seal member than that of the first piston 11 and is actuated faster. Therefore, the actuation of the second piston 12 is completed before the first piston 11 crosses the gap 51 (before the first piston 11 abuts on the retaining nut 18), the pressure is applied to the thin portion 15 having weak stiffness and the outer circumferential surface of the thin portion is pressed to the inner circumferential surface of the cylinder 2 such that the hydraulic pressure generating unit 55 is fixed in the cylinder 2 in the thrust direction.

As described above, the cylinder device 1 includes fixing means for generating a force in the radial direction from the force in the thrust direction, which is applied to the hydraulic chamber by the pneumatic chamber, and fixing the hydraulic chamber in the cylinder 2 due to the force in the radial direction.

The hydraulic chamber generates the hydraulic pressure by receiving a force in a direction to the other end side (output side), which is applied to the hydraulic chamber by the pneumatic chamber, and receiving a force in a direction to the one end side (input side), which is applied to the hydraulic chamber by the output rod.

More specifically, the fixing means (thin portion 15) generates the force in the radial direction due to the hydraulic pressure of the second hydraulic chamber 32 and fixes the second hydraulic chamber 32 and the first hydraulic chamber 31 by pressing, to the inner wall of the cylinder 2, a side wall of the second hydraulic chamber 32, which is elastically deformed due to the force in the radial direction.

The outer circumferential surface of the lid 34 is provided with the male screw and is fixed by screwing the male screw in the female threads formed on the end portion of the piston housing 14 on the output side.

The lid 34 has a through-hole at the center thereof, and the front end portion of the rod portion 50 of the first piston 11 is inserted into the through-hole.

The third piston 13 provided with the output rod 7 on the input side along the centerline is disposed on the output side of the lid 34, and the first hydraulic chamber 31 is formed by being partitioned by a space formed by the end surface of the lid 34 on the output side, the end surface of the front end portion of the rod portion 50, the end surface of the third piston 13 on the input side, the end surface of an oil filler plug 38 on the input side to be described below, and the inner circumferential surface of the piston housing 14.

As described above, the first hydraulic chamber 31 includes an output piston (third piston 13) that presses the output rod 7 in an output direction.

An oil supply channel formed in the third piston 13 communicates with the end surface on the output side and the end surface on the input side of the third piston and reaches the first hydraulic chamber 31. On the output side of the oil supply channel, the oil filler plug 38 for sealing the first hydraulic chamber 31 after oil supply is fixed by a screw mechanism.

The output rod 7 penetrates through the first hydraulic chamber 31 and further extends to the outside of the lid 3 through the inside of the rod portion 50 and the through-hole of the lid 3 by penetrating through the second hydraulic chamber 32, the second pneumatic chamber 22, and the first pneumatic chamber 21.

The claw 76 that protrudes in an orthogonal direction to the axial direction of the output rod 7 is formed on the front end of the output rod 7.

The claw 76 is pulled to (pulled into) the side of the lid 3 when the output rod 7 moves in the output direction, and the end surface of the claw 76 on the output side presses the workpiece 100 mounted on the workpiece mounting stand 101 to the output side.

With the configuration, when the first piston 11 approaches the piston housing 14, the rod portion 50 is inserted into the first hydraulic chamber 31 such that the oil in the first hydraulic chamber 31 is pressurized, and the output rod 7 receives the pressurized hydraulic pressure and moves to the output side.

Here, P1 represents pressure of the air in the first pneumatic chamber 21 and the second pneumatic chamber 22, S3 represents a sectional area of the first piston 11 in the first pneumatic chamber 21, P3 represents the hydraulic pressure of the first hydraulic chamber 31, and S4 represents a sectional area of the first piston 11 in the first hydraulic chamber 31.

In this case, a relationship of $P3=S3 \cdot P1/S4$ is satisfied. When an expression of $S3>S4$ is satisfied, the pressure of the first pneumatic chamber 21 is amplified and transmitted to the first hydraulic chamber 31.

In addition, when S5 represents a sectional area of the third piston 13 in the first hydraulic chamber 31, a force F with which the output rod 7 presses the workpiece 100 is obtained in an expression of $F=P1 \cdot S3 \cdot S5/S4$.

The hydraulic system (hydraulic chamber 30) of the cylinder device 1 is set such that the pressure of the first pneumatic chamber 21 is amplified in the first hydraulic chamber 31 by the rod portion 50 of the first piston 11 and the force F3 required for processing of the workpiece 100 is exhibited by the output rod 7 (the thrust is increased).

As described above, the cylinder device 1 includes hydraulic pressure amplifying means (the piston 11 or the rod portion 50) that amplifies the hydraulic pressure, which is generated in the first hydraulic chamber 31 by the pneumatic chamber 20, and the output rod 7 that extends to the outside of the cylinder 2 on the one end side (input side) by penetrating through the hydraulic pressure amplifying means and the pneumatic chamber and outputs the amplified hydraulic pressure to the one end side. The hydraulic pressure amplifying means amplifies the hydraulic pressure generated in the first hydraulic chamber 31 and outputs the amplified hydraulic pressure to the output rod 7.

An opened end of the piston housing 14 on the output side is provided with a screw groove, and a retaining nut 37 provided with a through-hole at the center, into which the output rod 7 is inserted, is screwed to the screw groove.

A gap 54 for securing a stroke of movement of the third piston 13 in the output direction is formed between the end surface of the third piston 13 on the output side and the end surface of the retaining nut 37 on the input side. The end surface of the retaining nut 37 is provided with a through-hole 53 for insertion of the air in the gap 54 during the movement of the third piston 13.

A spring (not illustrated) may be disposed in the gap 54 between the end surface of the third piston 13 on the output side and the retaining nut 37. The spring functions as an assistant member that presses the third piston 13 to the input side.

The lid 4 is a circular cylindrical member and is provided with a recessed portion on the input side thereof, into which the cylinder 2 is inserted.

The inner circumferential surface of the recessed portion is provided with female threads and a male screw formed on a corresponding outer circumferential surface of the cylinder 2 is fitted in the female threads. In this manner, the lid and the cylinder are screwed to each other.

Similar to the projecting portion 44 of the lid 3, a projecting portion provided with a groove is formed on the bottom surface of the corresponding recessed portion.

Further, a side surface of the lid 4 is provided with an inlet/outlet channel that communicates with the inside of the cylinder 2 from the second inlet/outlet 6, and the third pneumatic chamber 41, which performs intake or exhaust from the second inlet/outlet 6, is formed on the output side in the cylinder 2.

The first inlet/outlet 5 is opened and the air is supplied from the second inlet/outlet 6, and thereby the third pneumatic chamber 41 causes the hydraulic pressure generating unit 55 to move to the input side and is used to cause the cylinder device 1 to return to the initial state.

As described above, the cylinder device 1 includes the third pneumatic chamber 41 that is provided on the other end side in the cylinder, has the second inlet/outlet 6, and presses the hydraulic chamber (hydraulic chamber 30) to the one end side.

As described above, the cylinder device 1 configured as described above is actuated as follows.

First, while the first inlet/outlet 5 is opened and the pneumatic chambers 20 (the first pneumatic chamber 21 and the second pneumatic chamber 22) are depressurized, air is supplied from the second inlet/outlet 6 such that the pneumatic chambers 20 and the hydraulic chambers 30 (first hydraulic chamber 31 and the second hydraulic chamber 32) are set to the initial state.

Next, while the second inlet/outlet 6 is opened and the third pneumatic chambers 41 are depressurized, air is supplied from the first inlet/outlet 5.

The pressure of the first pneumatic chamber 21 and the second pneumatic chamber 22 is increased and the first piston 11 presses the hydraulic pressure generating unit 55. In this manner, the hydraulic pressure generating unit 55 slides and moves to the output side until the claw 76 of the output rod 7 abuts on the workpiece 100.

As described above, the first piston 11 causes the second pneumatic chamber 22, the first hydraulic chamber 31, and the second hydraulic chamber 32 to move to the other end side (output side) until the output rod 7 abuts on the pressing target (workpiece 100) due to the pressure of the first pneumatic chamber 21.

When the hydraulic pressure generating unit 55 moves and the claw 76 of the output rod 7 abuts on the workpiece 100, the first piston 11 pressurizes the first hydraulic chamber 31 and the second piston 12 pressurizes the second hydraulic chamber 32. Therefore, the oils in the first hydraulic chamber 31 and the second hydraulic chamber 32 are pressurized to increase these hydraulic pressures.

In the hydraulic pressure generating unit 55, the sectional area on the output side is larger than the sectional area on the input side by a portion of the sectional area of the rod portion 58, of the sectional area of the inner wall of the second hydraulic chamber 32 in the thrust direction, and thus pressing force is generated by a difference between the sectional areas in the direction of the output rod 7.

At this time, since the hydraulic pressure generated in the first hydraulic chamber 31 presses the end surface of the lid 34 on the output side, the force is generated to cause the hydraulic pressure generating unit 55 to move to the input side.

In the case where the force of causing movement to the output side by the second hydraulic chamber 32 is larger in the relationship between opposing forces of causing the movements to the output side and the input side, the claw 76 of the output rod 7 abuts on the workpiece so as to be stopped. Thus, the hydraulic pressure generating unit 55 also stops at the position.

In this manner, since the oil inside the second hydraulic chamber 32 cannot move in the thrust direction, the internal pressure is further increased and the thin portion 15 is pressed and elastically deformed, in the radial direction, thereby abutting the thin portion on the inner circumferential surface of the cylinder 2. In this manner, the hydraulic pressure generating unit 55 is fixed in the cylinder 2.

On the other hand, in a case where the force of causing the movement to the input side by the first hydraulic chamber 31 is larger, the second piston 12 has lower sliding resistance than that of the first piston 11 and is actuated faster. Therefore, the actuation of the second piston 12 is completed before the first piston 11 crosses the gap 51, the pressure is applied to the thin portion 15 having the weak stiffness, and the outer circumferential surface of the thin portion is pressed to the inner circumferential surface of the cylinder 2 such that the hydraulic pressure generating unit 55 is fixed in the cylinder 2 in the thrust direction.

In a state in which the hydraulic pressure generating unit 55 is fixed, the hydraulic pressure of the first hydraulic chamber 31 and the second hydraulic chamber 32 is further increased because the air is further supplied to the pneumatic chamber 20. In this manner, the thin portion 15 further presses the cylinder 2 and a grip force by the pressing force of the thin portion 15 is increased. The grip force by the thin portion 15 is increased, and thereby the hydraulic pressure generating unit 55 is firmly held in the thrust direction (fixing of the hydraulic pressure generating unit 55 to cylinder 2 with the thin portion 15). Motion is not performed even when a force in the thrust direction, in which the hydraulic pressure of the first hydraulic chamber 31 is generated, is received. The hydraulic pressure of the first hydraulic chamber 31 is applied to the output rod 7 and the workpiece 100 is pressed due to the hydraulic pressure via the claw 76.

At this time, in a case where the claw 76 abuts on the workpiece 100, and then there is no movement, deformation, or the like due to the hydraulic pressure applied from the output rod 7 only by pressing or fixing the workpiece 100 at the position, the third piston 13 does not move in the thrust direction inside the first hydraulic chamber 31, and thus the oil in the first hydraulic chamber 31 is not taken out to the outside along with movement of the O-ring of the third piston 13 (refer to FIG. 1B).

In addition, the second hydraulic chamber 32 is sealed to contain the oil inside and has a constant volume. Therefore, when the thin portion 15 expands in the radial direction, a volume in the thrust direction is reduced and shortened by an increase in volume in the radial direction, and the second piston 12 can move forward by the shortened amount of the volume. The thin portion 15 has a very small amount of deformation in the radial direction and has a small amount of deformation in the thrust direction depending on the deformation in the radial direction, and thus the second piston 12 also has a small distance of movement and little moves. Therefore, the oil in the second hydraulic chamber 32 is not taken out to the outside by moving the O-ring (refer to FIG. 1B) of the second piston 12. In the embodiment, the movement distance of the second piston 12 is set to a distance within a range of the elastic deformation of a seal member such as the O-ring (the seal member of the second hydraulic chamber 32 disposed on the second piston 12). In the embodiment, the O-ring does not move at all, and thus the internal oil is not taken out to the outside.

When a pressing process against the workpiece 100 is ended, the first inlet/outlet 5 is opened, and the first pneumatic chamber 21 and the second pneumatic chamber 22 are depressurized.

In this manner, the hydraulic pressure of the hydraulic chamber 31 and the hydraulic chamber 32 is reduced.

In the second hydraulic chamber 32, the elastic deformation of the thin portion 15 is restored due to the restoring force and the fixing of the hydraulic pressure generating unit 55 is canceled. In addition, the second piston 12 returns to a position of the initial state due to the bias force of the coil spring 33.

Next, an example, in which the workpiece 100 is pressed and clamped by using the cylinder device 1, will be described.

The optimal clamping member is to be attached to the front end of the output rod 7 in order to press and clamp the workpiece 100 in the cylinder device 1.

The cylinder device 1 performs clamping actuation of a member that presses and clamps the workpiece 100 in the following order.

(1) First, the first inlet/outlet 5 is opened and the air is supplied to the second inlet/outlet 6, and thereby the cylinder device 1 comes into the initial state. In this manner, the clamping member retreats, and the workpiece 100 is mounted at a predetermined position. At this time, the workpiece 100 is mounted not to move even when being pressed.

(2) The second inlet/outlet 6 is opened and the air is supplied from the first inlet/outlet 5. The output rod 7 moves forward in the output direction by air drive, and the clamping member attached on the front end of the output rod 7 abuts on the workpiece 100.

(3) When the clamping member abuts on the workpiece, the pressure of the pneumatic chamber 20 is increased and the hydraulic pressure generating unit 55 is fixed to the cylinder 2. The thrust is generated in the output rod 7 due to the hydraulic pressure. In this manner, the workpiece 100 is strongly forced to be clamped to a member that clamps the workpiece 100, in order to press the workpiece 100 with a strong force.

(4) In a case where the workpiece 100 is released from the clamping member, the first inlet/outlet 5 is opened and the air is supplied from the second inlet/outlet 6. The output rod 7 retreats by the air drive, and then the workpiece 100 is detached from a predetermined position.

Hereinafter, while the workpiece 100 is replaced, the cycle described above is repeatedly performed.

Here, a case of generating hydraulic pressure in a cylinder end, that is, generating the hydraulic pressure in a state in which the hydraulic pressure generating unit 55 abuts on the cylinder end (lid 4) on the output side is described. In this example of the actuation, it is possible to generate hydraulic thrust even when the output rod 7 does not abut on the workpiece 100 in some cases.

Hereinafter, the actuation will be described.

When the hydraulic pressure generating unit 55 moves forward and abuts on the cylinder end (lid 4), the second piston presses the second hydraulic chamber 32 by the second pneumatic chamber 22 and the first piston simultaneously presses the first hydraulic chamber 31 by the first pneumatic chamber 21. Since the hydraulic pressure generating unit 55 cannot move forward, the oil inside the second hydraulic chamber 32 is constricted and pressurized by the lid 34 and the second piston 12. The thin portion 15 is elastically deformed and fixes the inner wall of the cylinder 2. At this time, since the sliding resistance of the second piston 12 is lower than that of the first piston 11, the second piston is actuated faster, and the actuation of the second piston 12 is completed before the first piston 11 crosses the gap 51.

When the hydraulic pressure generating unit 55 is fixed to the cylinder 2, the grip force in the thrust direction is increased and the stiffness is increased. Thus, the hydraulic thrust that is generated in the first hydraulic chamber 31 in the thrust direction can be received, and the hydraulic thrust is generated in the output rod 7.

In this manner, even in a state in which the output rod 7 does not abut on the workpiece, it is possible to apply the hydraulic thrust to the output rod 7.

FIGS. 2A to 2D are views for illustrating an example in which press working is performed by using the cylinder device 1.

The press machine (not illustrated) fixes the cylinder device 1 with the output direction as a downward direction (that is, the output rod 7 facing upward).

On the output side of the claw 76 attached as the tool to the output rod 7, a mounting stand 73, a part 72, and a pin 71 are disposed from below in this order. The mounting stand 73 functions as workpiece mounting means.

The part 72 is provided with a through-hole into which the pin 71 is inserted in an interference-fitting manner, and thus the pin 71 is temporarily inserted into the through-hole in advance.

In the cylinder device 1, the pins 71 temporarily inserted in the following order of numbers in parentheses are press-fitted.

(1) First, the first inlet/outlet 5 is opened and the air is supplied to the second inlet/outlet 6, and thereby the cylinder device 1 is in the initial state. In this manner, the claw 76 retreats, and the part 72 into which the pin 71 is temporarily inserted on the mounting stand 73 is mounted at a predetermined position.

(2) Next, the second inlet/outlet 6 is opened and the air is supplied from the first inlet/outlet 5.

The output rod 7 moves forward in the output direction (downward) by the air drive, and the end surface of the claw 76 abuts on the front end of the pin 71.

(3) When the claw 76 abuts on the pin 71, the pressure of the pneumatic chamber 20 is increased, the hydraulic pressure generating unit 55 is fixed to the cylinder 2, and the output rod 7 is driven due to the hydraulic pressure. In this manner, the claw 76 is pressed to the pin 71 with strong force, and the pin 71 is press-fitted in a hole of the part 72. As described above, the press machine includes press means.

(4) When the press-fitting is ended, the first inlet/outlet 5 is opened and the air is supplied from the second inlet/outlet 6. The claw 76 is pulled up by the air drive, and then the part 72 is detached from the predetermined position. As described above, the press machine includes detachment means.

Modification Example of First Embodiment

In the cylinder device 1, the output rod 7, the rod portion 50, and the rod portion 58 are coaxially formed. In this manner, the output rod 7 has a degree of freedom of rotating around the central axis.

In the modification example, in order for the output rod 7 not to rotate around the central axis by regulating the degree of freedom, the output rod 7, the rod portion 50, and the rod portion 58 are formed to be eccentric from the centerline of the cylinder 2 (such that the centerline of the output rod 7, the rod portion 50, and the rod portion 58 is not coincident with the centerline of the cylinder 2).

In other words, the rod portion 50, the rod portion 58, and the output rod 7 are formed from the first piston 11, the second piston 12, and the third piston 13, at a position offset from the center of the pistons like an eccentric pin.

According to this, the through-holes of the lid 3, the retaining nut 18, the protruding portion 57, and the lid 34 are also eccentrically formed.

In this manner, the output rod 7 can perform piston motion, while an angle of the claw 76 is constantly maintained.

In addition, it is possible to use a cam mechanism to be described below as a method of controlling the rotation angle of the output rod 7 around the central axis.

Second Embodiment

In a cylinder device 1a of the embodiment, the cam mechanism is used, and thereby the rotation angle of the output rod 7 around the central axis is changed depending on the movement of the output rod 7 in the thrust direction.

Hereinafter, the description of the same parts as the first embodiment will be simplified or omitted, and differences will be described.

FIG. 3A illustrates a sectional view of the cylinder device 1a in the thrust direction, and FIG. 3B illustrates a view of parts.

The third piston 13 is provided with a blind hole 81 formed from the end surface thereof on the output side to the middle of the output rod 7 along the centerline of the third piston.

The blind hole 81 is not the through-hole but is in a blind state in which one end side is blocked, in order to prevent the air in the third pneumatic chamber 41 from leaking from the hole.

The recessed portion of the lid 4 on the input side is provided with a fixing hole of a camshaft rod 82 along the centerline, and the camshaft rod 82 is fixed to the input side of the fixing hole by a screw mechanism or the like.

In this manner, the camshaft rod 82 extends from the end portion of the lid 4 on the input side to the side of the output rod 7 along the centerline of the cylinder 2.

The camshaft rod 82 is formed to have an outer diameter smaller than an inner diameter of the through-hole 53 of the retaining nut 37 or the blind hole 81 of the output rod 7, and the camshaft rod 82 is inserted into the blind hole 81 of the output rod 7 by penetrating through the through-hole 53 of the retaining nut 37.

The camshaft rod 82 is fixed to the lid 4 and the hydraulic pressure generating unit 55 moves in the thrust direction. Therefore, the inner circumferential surface of the blind hole 81 slides over the outer circumferential surface of the camshaft rod 82 along with the movement of the hydraulic pressure generating unit 55.

The length of the blind hole 81 is set to a length with which the bottom surface of the blind hole 81 does not come into contact with the front end of the camshaft rod 82 even in a case where the hydraulic pressure generating unit 55 moves to the output-most side.

A guide groove 83 is formed in a longitudinal direction on a side surface of the camshaft rod 82, and the camshaft rod 82 is fixed such that the guide groove 83 faces a cam pin 80 to be described next.

The third piston 13 is provided with a through-hole formed from the side surface to the blind hole 81 in the first hydraulic chamber 31. The cam pin 80 is inserted into the through-hole and is fixed, for example, by the screw mechanism, and the front end portion of the cam pin 80 engages with the guide groove 83 (that is, the front end portion is fitted to the cam pin 80).

A predetermined clearance (gap) is set between the end surface of the front end of the cam pin 80 and the bottom surface of the guide groove 83, and thereby an outer circumferential side surface of the cam pin 80 is to come into contact with the side surface of the guide groove 83 during sliding.

The guide groove 83 plays a role of a guide of linear drive of the claw 76 in a case of a straight line as illustrated in FIGS. 3A and 3B. In addition, the guide groove 83 may be formed to have a helical shape in a region corresponding to a circling range in which the claw 76 can be driven to circle in a position on the guide groove.

In other words, the guide groove 83 includes a helical groove formed to connect phase positions to each other in the radial direction, which correspond to start and end positions of circling of the output rod 7 and the claw 76, and a linear groove portion extending in the axial direction from the end portion of the helical groove on the output side further toward the output side (direction to the lid 4). The linear groove portion is formed to cause the claw 76 to perform linear movement in the axial direction by pneumatic drive such that the workpiece 100 and the claw 76 abut on each other during the linear movement and, then, the workpiece 100 is caused to be pulled into (pushed into).

When the hydraulic pressure generating unit 55 moves in the thrust direction, the cam pin 80 engages with the guide groove 83, and thus the hydraulic pressure generating unit 55 rotates around the central axis along the guide groove 83. In this manner, the output rod 7 also rotates along the guide groove 83.

The length of camshaft rod 82 and the guide groove 83 is set to a length with which the cam pin 80 engages with the guide groove 83 even in a case where the hydraulic pressure generating unit 55 moves to the input-most side.

The state illustrated in the figure is the initial state, and the state in which the cam pin 80 is positioned on the input-most side of the camshaft rod 82 is illustrated.

A position of the cam pin 80 obtained when the hydraulic pressure generating unit 55 moves to the output-most side is a position of a cam pin 80a illustrated by a dashed line in the figure.

The guide groove 83 between both positions regulates a mode of rotation of the output rod 7.

In a portion in which the guide groove 83 is formed on a straight line along the axis line of the camshaft rod 82, the output rod 7 moves with an angle maintained constantly. In a portion in which the guide groove 83 is twisted to have a spiral shape, the output rod 7 rotates along the twist.

Therefore, when the shape of the guide groove 83 is appropriately set, a cam mechanism of the cam pin 80 and the guide groove 83 can cause the claw 76 attached to the front end of the output rod 7 to rotate at a predetermined angle in synchronization with the movement of the output rod 7.

For example, when the claw 76 moves to the input side and the workpiece 100 is mounted on the workpiece mounting stand 101, it is possible to regulate, with the shape of the guide groove 83, actuation of causing the claw 76 to rotate at an angle at which the claw does not interfere with an operation of mounting the workpiece 100 and pressing the abutting on the workpiece 100 while the claw 76 is caused to rotate to the side of the workpiece 100 after the workpiece 100 is mounted.

As described above, the cam mechanism functions as rotation angle changing means for changing the rotation angle of the output rod around the central axis during the movement of the output rod, and the rotation angle changing means may change the rotation angle of the output rod by using a sliding mechanism of the output rod, a protruding member (cam pin 80) formed on one side, and a groove (guide groove 83) that is formed on the other side, engages with the protruding member (cam pin 80), and is formed in a moving direction of the output rod, of a sliding surface opposite to the output rod.

Third Embodiment

In the cylinder device 1a of the second embodiment, since the cam pin 80 is inserted into the first hydraulic chamber 31, it is advantageous to decrease a size of a structure; however, replacement of the cam pin 80 requires effort and time.

Hence, in a cylinder device 1b of a third embodiment, the cam pin 80 is disposed at a position at which the replacement is easily performed.

Figure 4:
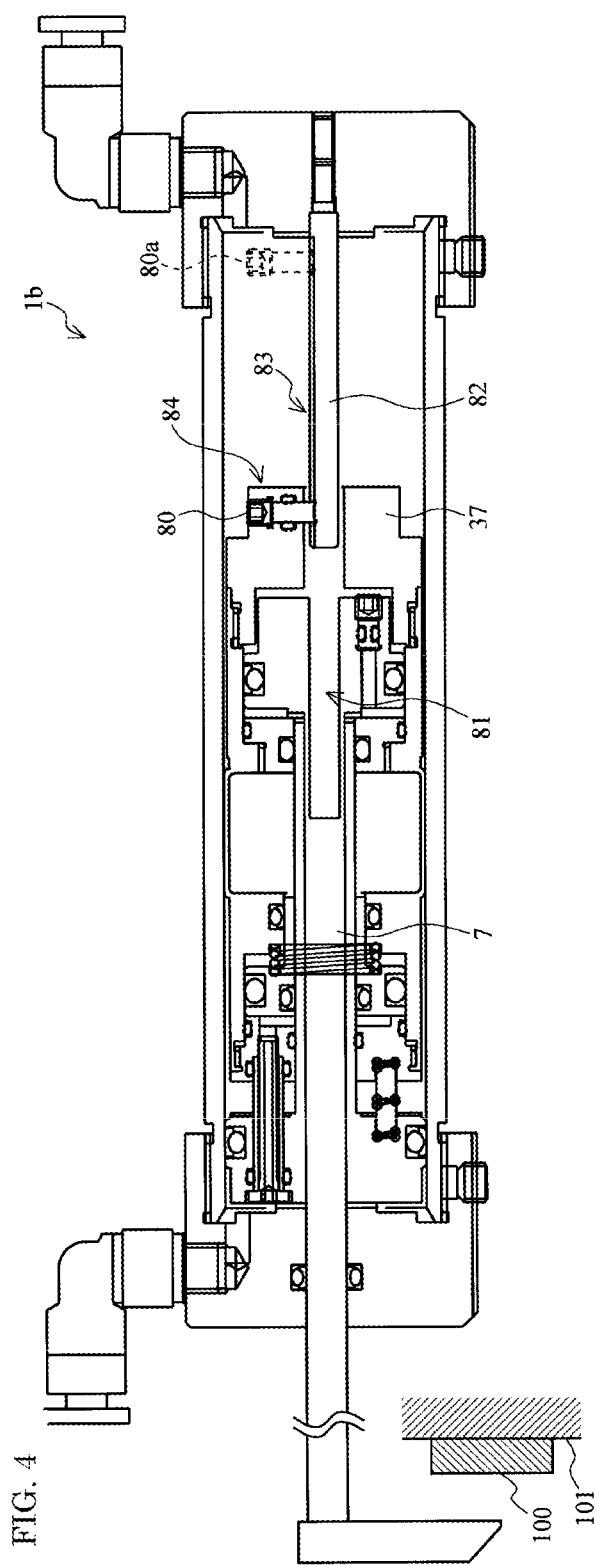
FIG. 4 is a view for illustrating a cylinder device of a third embodiment.

FIG. 4 illustrates a sectional view of the cylinder device 1b in the thrust direction.

In the cylinder device 1b, a projecting portion 84 is formed on the output side of the retaining nut 37, and the cam pin 80 is fixed to the through-hole formed in the side surface of the projecting portion 84.

The cam pin 80a illustrated by the dashed line illustrates a position obtained when the cam pin 80 moves to the output-most side. The other configuration is the same as that of the cylinder device 1a.

As described above, in the cylinder device 1b, the cam pin 80 is exposed to the outside of the hydraulic pressure generating unit 55, and thus the total length of the cylinder device 1b is longer than that of the cylinder device 1a; however, the replacement of the cam pin 80 is easily performed.

Fourth Embodiment

In a cylinder device 1c according to the embodiment, the hydraulic pressure generating unit 55 is fixed to the cylinder 2 by a clamper 90.

Figure 5A:
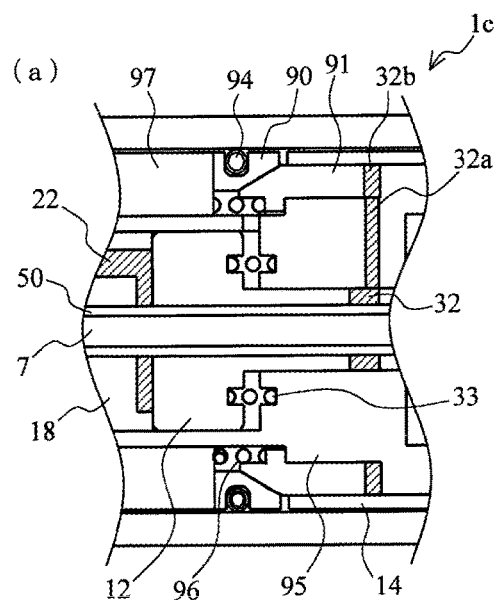
FIGS. 5A to 5D are views for illustrating a cylinder device of a fourth embodiment.
Figure 5B:
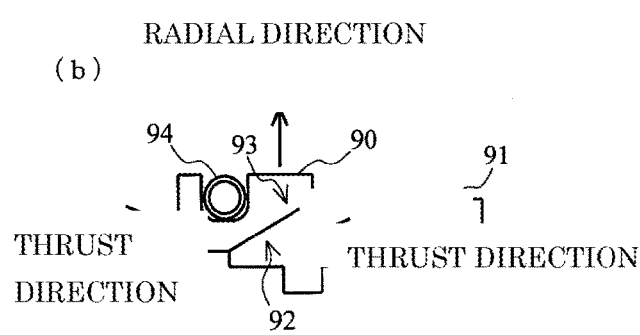
Figure 5C:
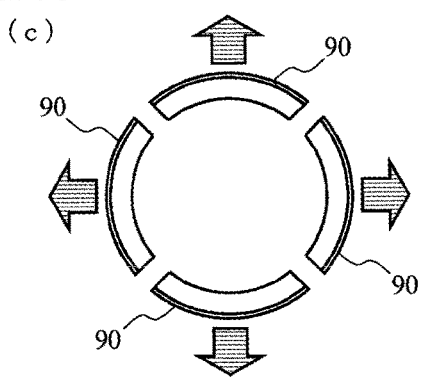
Figure 5D:
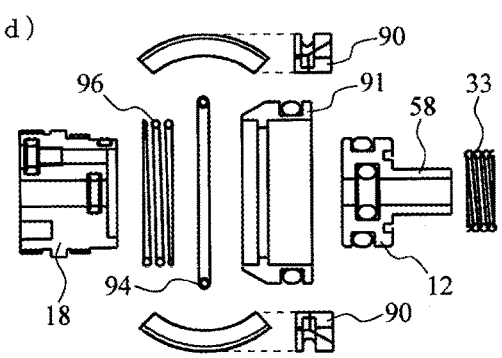

FIG. 5A illustrates a sectional view of the cylinder device 1c around the clamper 90 in the thrust direction, and FIG. 5D illustrates a view of parts around the clamper 90.

In FIG. 5A, the entire figure is not provided but the vicinity of the second pneumatic chamber 22 and the second hydraulic chamber 32 are cut out and illustrated.

The end surface of the second hydraulic chamber 32 on the input side is configured to have an end surface of a circular column member 95 fixed to the piston housing 14 and an end surface of an annular member 91 provided around the circular column member 95.

The annular member 91 has an inner circumferential surface being in contact with an outer circumferential surface of the circular column member 95 and an outer circumferential surface being in contact with an inner circumferential surface of the piston housing 14. Such a contact surface is sealed by an O-ring, and the annular member 91 having airtightness as it is can move in the thrust direction.

The circular column member 95 is provided with female threads on the input side thereof and a member corresponding to the retaining nut 18 in the first embodiment is attached to the female threads. A male screw is formed on the input side of the member corresponding to the retaining nut 18, and a nut 97 is screwed and fixed thereto.

A coil spring 96 is disposed between the end surface of the nut 97 on the output side and the annular member 91. While the annular member 91 secures a space that configures the second hydraulic chamber 32 (although not illustrated, restriction means for restricting movement of the annular member 91 to the output side is provided in order to secure the space), and the coil spring 96 causes the bias on the output side.

Therefore, the annular member 91 moves to the input side when the hydraulic pressure of the second hydraulic chamber 32 is increased, and the annular member 91 moves to the output side and returns to the original position when the hydraulic pressure is reduced.

As illustrated in FIG. 5B, a taper portion 92 is formed on the end portion of the annular member 91 on the input side, and an outer diameter of the taper portion is reduced as a portion approaches the input side (left side in the Figure).

The clamper 90 is disposed in a space formed between the taper portion 92 and the end surface of the nut 97 on the output side of the annular member 91.

The clamper 90 is an annular member in which a taper portion 93, of which an inner diameter is reduced as a portion approaches the input side, is formed and an angle of the taper portion 93 is equal to an angle of the taper portion 92.

The clamper 90 illustrated in FIG. 5C is divided into four parts so as to be widened in the radial direction represented by arrow lines.

An outer circumferential surface of the clamper 90 is formed to be parallel to the inner circumferential surface of the cylinder 2, and a predetermined clearance is formed between the outer circumferential surface of the clamper 90 and the inner circumferential surface of the cylinder 2 in the initial state such that the frictional force is not generated between the two surfaces.

Further, the outer circumferential surface of the clamper 90 is provided with a groove in a circumferential direction, and the O-ring 94 is disposed in the groove.

In general, the O-ring is disposed to maintain the airtightness; however, the O-ring 94 is disposed to cause the clamper 90 widened in the radial direction to return to the original state.

Therefore, the height of the groove formed in the outer circumferential surface of the clamper 90 is set to a size larger than the diameter of the O-ring 94, and thus the O-ring 94 is provided not to be in contact with the inner circumferential surface of the cylinder 2.

In the embodiment, the O-ring 94 is used; however, in a case where the clamper is widened in the radial direction and the inner diameter is increased, any member may be used as long as the member contracts the widened size to the original inner diameter and causes the clamper to return to the original state. For example, a ring-shaped elastic member having a string shape with elasticity may be used. In addition, a member having an annular shape by joining both ends of the coil spring may be used.

In the cylinder device 1b configured as described above, in the initial state, the pressure of the second hydraulic chamber 32 is low, and thus the coil spring 96 biases the annular member 91 to the output side. In this manner, a sufficient clearance is secured between the end surface of the nut 97 on the output side and the taper portion 92 of the annular member 91.

Therefore, the clamper 90 is bundled up by contractile force of the O-ring 94 in the central axis direction, and thus a clearance is formed between the clamper 90 and the inner circumferential surface of the cylinder 2 such that the hydraulic pressure generating unit 55 is movable in the thrust direction.

On the other hand, when the pressure of the second hydraulic chamber 32 is increased, the clamper 90 is pushed and moves in the direction to the input side due to the hydraulic pressure.

The clamper 90 is sandwiched between the end surface of the nut 97 on the output side and the taper portion 92 of the annular member 91 and receives a force in the thrust direction from both end sides as illustrated by an arrow line in FIG. 5B.

To be specifically described, when the second piston 12 moves forward, the pressure of the second hydraulic chamber 32 is increased, and the increase in pressure reaches a hydraulic chamber 32b (second hydraulic chamber) of a space of the end surface of the annular member 91 through a communication channel 32a.

The annular member 91 moves to the input side while the clamper 90 is widened, when a force, with which the O-ring 94 contracts the clamper 90, is smaller than a force that is generated due to the pressure of the second hydraulic chamber 32 and causes movement in the thrust direction. At this time, the oil inside the second hydraulic chamber 32, which is pushed by the second piston 12, flows into the space of the end surface through the communication channel 32a and thus the annular member 91 moves in the thrust direction.

The force in the thrust direction is converted into a force in the radial direction as illustrated by an arrow line in FIG. 5B, by abutting of the taper portion 92 of the annular member 91 and the taper portion 93 of the clamper 90. As a result, the clamper 90 is pushed in the radial direction.

In this manner, the outer circumferential surface of the clamper 90 abuts on the inner circumferential surface of the cylinder 2, the frictional force is generated therebetween, and the hydraulic pressure generating unit 55 is fixed in the cylinder 2.

A fixing method by the clamper 90 used in the fourth embodiment can be used in the first embodiment, the second embodiment, and the third embodiment.

In this example, the force in the radial direction is generated by pressing, to the clamper 90, the taper member (annular member 91) moving in the thrust direction, due to the hydraulic pressure generated in the second hydraulic chamber 32, and the second hydraulic chamber 32 and the first hydraulic chamber 31 are fixed by pressing the clamper 90 to the inner wall of the cylinder by the force.

According to the embodiments described above, it is possible to obtain the following effects.

(1) By skillfully combining an air piston and a hydraulic piston and internally providing an air hydraulic mechanism, the piston can be actuated as the air piston until the piston abuts on the workpiece 100 and can be actuated as the hydraulic cylinder after the piston abuts on the workpiece 100, and thus it is possible to realize both of the movement of the long stroke by the air piston and the large thrust as the characteristic of the hydraulic piston, with only air supply for which there is no need to provide individual ancillary equipment such as a hydraulic pump or hydraulic piping or the like requiring labor for construction.

(2) After the stroke required by the air piston is obtained, the force in the thrust direction is converted into the force in the radial direction by the elastic deformation of the thin portion 15, pushing of the clamper 90, or the like, such that it is possible to fix the hydraulic piston in the cylinder 2.

(3) The force in the radial direction is increased due to the hydraulic pressure such that it is possible to fix the hydraulic piston, and thus the hydraulic piston can be firmly fixed.

(4) It is possible to generate a large force by generating the hydraulic pressure in the hydraulic cylinder fixed in the cylinder 2.

(5) Since the necessary stroke is almost obtained by the air piston and the requisite minimum stroke is obtained by the hydraulic piston, it is possible to decrease a length of the stroke of the hydraulic piston, and thus it is possible to minimize wear due to oil leakage.

In particular, in a case of a using method in which the output rod 7 abuts on the workpiece 100, and only the hydraulic pressure is applied to the workpiece without movement of the output rod 7 after the abutting, the movement distances of the hydraulic pistons in the hydraulic chambers are all within the range of the elastic deformation of the seal member, and thus it is possible not to cause leakage of oil inside the hydraulic chamber.

(6) It is possible to generate the force not in a separate direction in which the thrust to the output rod 7 is increased as far as from the position of the cylinder and the second housing 62 fixed to the inside of the cylinder 1 (a pushing-out direction to the outer side) but in an approach direction (pulling-into direction to the inner side), and thus it is possible to reliably transfer the necessary force for working of the workpiece 100.

(7) Since the cam mechanism that causes the output rod 7 to circle around the central axis line is provided, it is possible to dispose the claw 76 at a different phase from that of the workpiece 100 in the radial direction before the second housing 62 is fixed.

Next, fifth to seventh embodiments will be described.

In the fifth to seventh embodiments, it is possible to separately perform moving and fixing actuation (clamping actuation) of causing a piston housing 60 to move to a predetermined position by the air drive and, then, fixing the piston housing to the cylinder 2 and, then, hydraulic pressure outputting actuation of generating the hydraulic pressure amplified on the front end of the output rod 7 by the air hydraulic mechanism.

Fifth Embodiment

Hereinafter, the fifth embodiment will be described.

In the fifth embodiment, the hydraulic pressure in the radial direction is generated in the second hydraulic chamber 32 by the actuation of the rod portion 58 and the second piston 12 in the fixing actuation, and thereby the thin portion 15 expands, and the movement of the piston housing 60 is fixed to the cylinder 2.

On the other hand, in the hydraulic pressure outputting actuation, the front end of the rod portion 50 pushes the first hydraulic chamber 31 due to the movement of the first piston 11, and thereby the amplified hydraulic pressure amplified is generated by the output rod 7 from the third piston 13.

Figure 6A:
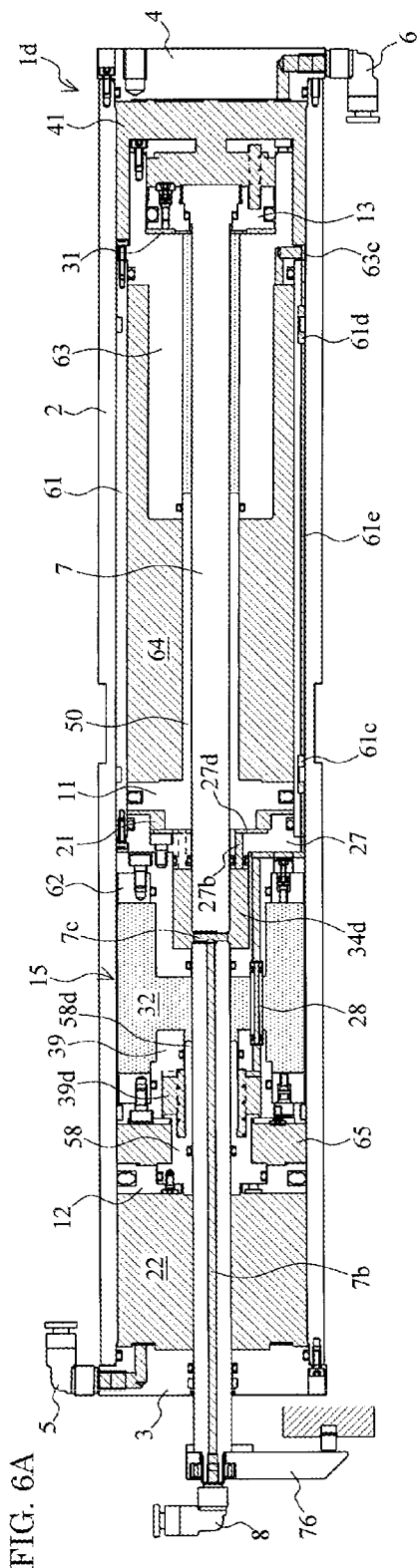
FIGS. 6A and 6B are views for illustrating a cylinder device of a fifth embodiment.
Figure 6B:
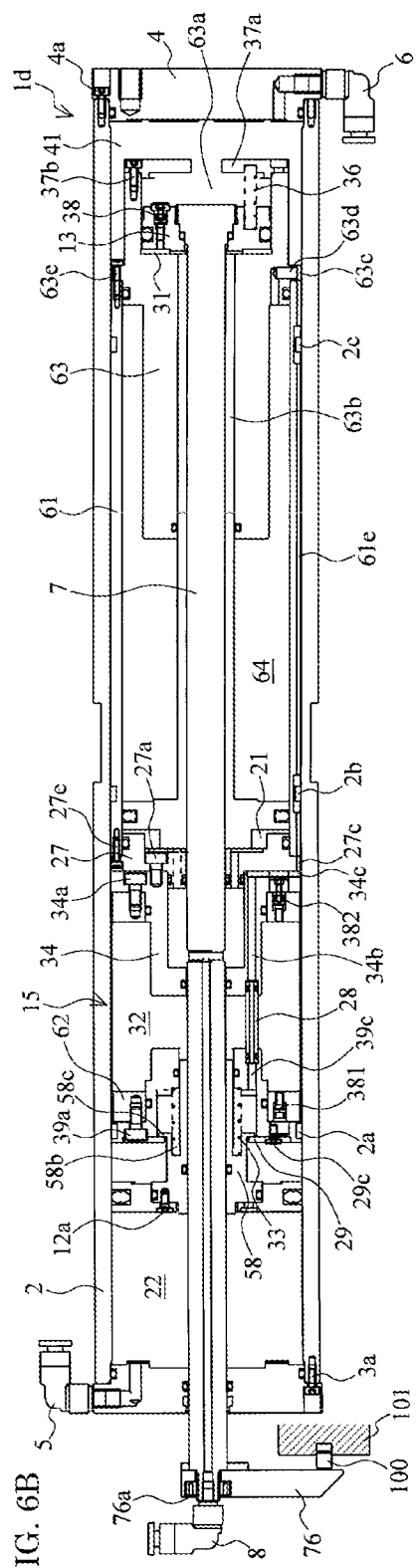

FIGS. 6A and 6B illustrate sectional views in the thrust direction showing a configuration of a cylinder device 1d in the fifth embodiment.

FIGS. 7A and 7B illustrate parts disposed in the cylinder 2, FIG. 7A illustrates a longitudinal section of the parts, and FIG. 7B is a front view and a side view of a first housing 61 and a front view of a retaining ring 29.

The same reference signs are assigned to portions having the same structures or the same functions as those in the first embodiment, and the description thereof is appropriately omitted. In addition, in FIGS. 6A and 6B, O-rings for sealing portions are illustrated; however, the description thereof is omitted. In addition, in order to make the figure easy to be viewed, similarly to the other embodiments, no distinct mark is applied to the sections, and reference signs are applied in FIGS. 6A and 6B separately. Only in FIG. 6A, hatched lines are applied to a region in which the air is present, dots are applied to a region in which the oil is present, and reference signs are assigned in association with main parts and regions filled with the air and oil.

As illustrated in FIGS. 6A to 7B, in the cylinder device 1d of the embodiment, instead of the piston housing 14 (refer to FIGS. 1A and 1B) in the first embodiment, the piston housing 60 (not illustrated) having the first housing 61, the second housing 62, and a third housing 63 is disposed in the cylinder 2.

As illustrated in FIGS. 6A and 6B, the housings are disposed from the input side in the order of the second housing 62 that accommodates the rod portion 58 connected to the second piston 12, the first housing 61 that accommodates the first piston 11 to which the rod portion 50 is continuously connected, and the third housing 63 that accommodates the third piston 13 to which the output rod 7 is continuously connected.

The second housing 62 is provided with thick portions on both end sides, the thin portion 15 is configured between the thick portions, and the second hydraulic chamber 32 is formed in the inner side of the thin portion 15.

The thick portions of the second housing 62 on both ends are provided with an oil supply hole for filling the second hydraulic chamber 32 with the oil. After the oil is injected from either one, the second housing 62 is sealed by an oil filler plug 381 and an oil filler plug 382.

A lid 39 is fixed to the end portion of the second housing 62 on the input side, by a plurality of bolts 39a disposed on the circumference thereof. The lid 39 corresponds to the protruding portion 57 in the first embodiment.

The lid 39 has a recessed portion 39d (refer to FIG. 7A) with a circular cylinder shape formed on the input side of the lid, and the bottom portion of the recessed portion 39d has, at the center thereof, a through-hole for the rod portion 58. On the outer side in the radial direction of the through-hole, a communication hole 39c that penetrates through the bottom portion of the recessed portion 39d in the axial direction is formed. The communication hole 39c configures a part of a path through which a fifth pneumatic chamber 65 to be described below communicates with the third pneumatic chamber 41.

The end portion of the lid 39 on the input side is provided with a flange having a clearance from an inner circumferential wall of the cylinder 2, and the circumferential surface of the flange is provided with a sliding assistant ring 2a. The sliding assistant ring 2a is made of a material (for example, a resin) other than metal, including other sliding assistant rings 2b and 2c, and is disposed to cause avoidance of metal contact between the cylinder 2, the lid 39, and the first housing 61 and to make smooth sliding between the inner circumferential surface of the cylinder 2 and the second housing 62.

The rod portion 58 is inserted to penetrate through the recessed portion 39d of the lid 39 and the through-hole at the center thereof. The second piston 12 is fixed to the rod portion 58 on the input side with a connection screw 12a.

The rod portion 58 has a diameter that increases gradually from the output side toward the input side and includes a small-diameter portion 58d and a medium-diameter portion. The rod portion 58 moves in the lid 39 in the output direction. In this manner, the second hydraulic chamber 32 formed in the second housing 62 is pressurized by the front end of the small-diameter portion 58d, the thin portion 15 is elastically deformed in the radial direction due to the hydraulic pressure, and the piston housings 60 (61 to 63) is fixed in the cylinder 2.

The medium-diameter portion of the rod portion 58 is provided with a recessed portion 58b formed along the outer circumference of the small-diameter portion 58d. The small-diameter portion 58d of the rod portion 58 is inserted into the coil spring 33, one end side of the coil spring 33 is disposed in the recessed portion 58b, and the other end side thereof abuts on the bottom surface of the recessed portion 39d formed in the lid 39.

The end surface of the medium-diameter portion of the rod portion 58 on the output side is provided with a flange 58c protruding in the radial direction.

Regarding the rod portion 58, in a state in which the small-diameter portion and the medium-diameter portion of the rod portion 58 inserted into the coil spring 33 penetrate through the lid 39, the retaining ring 29 is fixed to the lid 39 from the input side with a bolt 29c. An inner diameter of the retaining ring 29 is formed to be smaller than an outer diameter of the flange 58c of the rod portion 58, and thus the coil spring 33 biases the rod portion 58 to the input side such that the rod portion 58 does not slip out.

As illustrated in FIG. 7B, the retaining ring 29 is divided into two portions and is provided with a plurality of holes of a through-hole 29a through which the bolt 39a (for fixing the lid 39) penetrates on the same circumference and a bolt hole 29b for fixing the retaining ring 29 to the lid 39 with the bolt 29c. In addition, a joint divided into two portions has a gap without achieving close contact even when the joint is attached to the lid 39, and thus a configuration in which the air in the inside of the fifth pneumatic chamber 65 and the air in the inside of the communication hole 39c freely move to and from the insides thereof.

In a state in which the retaining ring 29 is fixed, the second piston 12 is fixed to the rod portion 58 with the connection screw 12a. As described above, the rod portion 58 and the second piston 12 are divided from each other because the fixing of the lid 39 with the bolt 39a and the fixing of the retaining ring 29 with the bolt 29c are performed.

The rod portion 58 is provided with a through-hole at the center, and the output rod 7, which will be described below, is inserted into the through-hole.

The end surface of the second piston 12 on the input side forms, with the lid 3 and the inner circumferential surface of the cylinder 2, the second pneumatic chamber 22, and the end surface of the second piston 12 on the output side forms, with the lid 39 and the cylinder 2, the fifth pneumatic chamber 65.

A part of the lid 34 is opposite to the lid 39 so as to be inserted into the end portion of the second housing 62 on the output side. The lid 34 is provided with a flange on the output side, the flange abuts on a thick portion of the end portion of the second housing 62 on the output side, and the lid 34 is fixed with a bolt 34a.

The center of the lid 34 projects on the input side (side of the second hydraulic chamber 32), the projecting region is provided with a recessed portion 34d on the inner side thereof, and the bottom surface of the recessed portion 34d is provided with a through-hole into which the output rod 7 is inserted.

A communication hole 34b penetrating through the lid 34 in the axial direction is provided on the outer side of the recessed portion 34d of the lid 34 in the radial direction. The communication hole 34b and the communication hole 39c of the lid 39 communicate with each other through a collar 28 disposed in the second hydraulic chamber 32.

The end surface of the lid 34 on the output side is provided with a communication groove 34c in the radial direction which is connected to the communication hole 34b.

The first housing 61 is disposed on the output side from the second housing 62, and a lid 27 is fixed to the end portion of the first housing 61 on the input side with a plurality of bolts 27e.

The lid 27 is fixed to the lid 34 with a bolt 27a from the inner side of the second housing 62 in a state of being fixed to the second housing 62. In this manner, the communication groove 34c formed in the lid 34 is covered with the lid 27, and an air passage is formed from the fifth pneumatic chamber 65.

The lid 27 is provided with a recessed portion 27f (refer to FIG. 7A) on the output side. The bottom surface of the recessed portion 27f functions as the end surface of the first pneumatic chamber 21 on the input side.

The lid 27 is provided with a communication hole 27b that penetrates through the bottom surface of the recessed portion 27f and communicates with the recessed portion 34d of the lid 34, and the bottom surface of the recessed portion 27f is provided with a communication groove 27d in the radial direction which is connected to the communication hole 27b.

In addition, the outer circumferential surface of the lid 27 is provided with a communication groove 27c in an axial direction which is connected to the communication groove 34c of the lid 34.

In a state in which the lid 27 is fixed to the lid 34 with the bolt 27a, the first piston 11 to which the rod portion 50 extends is disposed in the first housing 61 at the center thereof.

The disposition of the first piston 11 causes the first housing 61 to be partitioned by the first piston 11. Thus, the first pneumatic chamber 21 is formed on the input side and a fourth pneumatic chamber 64 is formed on the output side.

As illustrated in FIGS. 7A and 7B, the first housing 61 is provided with circumferential grooves 61a and 61b along the entire circumference thereof on both end sides. As described above, the sliding assistant rings 2b and 2c are fitted in the circumferential groove 61a, and thus the first housing smoothly slides with respect to the cylinder 2.

In addition, the first housing 61 is provided with the communication groove 61e along the entire length thereof in the axial direction (longitudinal direction). The end portion of the communication groove 61e on the input side is connected to the communication groove 27c of the lid 27.

In order not to block the communication hole 61e with the sliding assistant rings 2b and 2c fitted into the circumferential grooves 61a and 61b, recessed portions 61c and 61d are formed that have a width wider than the width of the sliding assistant rings 2b and 2c and are deeper than the thickness of the sliding assistant rings, at a position at which the circumferential grooves 61a and 61b intersect with the communication groove 61e. A passage of the air from the fifth pneumatic chamber 65 is formed between the communication groove 61e and the inner circumferential surface of the cylinder 2.

Back to FIGS. 6A and 6B, the third housing 63 is fixed, with a plurality of bolts 63e disposed in the circumferential direction, to the end portion of the first housing 61 on the output side, in which the first piston 11 is disposed on the inner side of the first housing.

The third housing 63 is provided with projecting portions on both sides of the input side and the output side when viewed from the fixed portion with the bolts 63e. The projecting portion on the output side has a diameter smaller than the inner diameter of the cylinder 2, and a recessed portion 63a is formed from the end surface in the axial direction. The projecting portion on the input side has a diameter smaller than the inner diameter of the first housing 61, and a through-hole 63b penetrating from the end portion on the input side to the bottom portion of the recessed portion 63a is formed, and the rod portion 50 of the first piston 11 is inserted into the through-hole 63b.

The third housing 63 is provided with a flange formed at an intermediate portion thereof in the axial direction. The flange of the third housing 63 is fixed to the second housing 62 at a plurality of positions in the circumferential direction with the bolts 63e.

The outer circumferential surface of the flange is provided with a groove 63c on in the axial direction.

In addition, the flange of the third housing 63 is provided with a communication hole 63d having an L-shaped section, which extends in the radial direction from a position, at which the groove 63c is connected to the flange, and is bent in the axial direction from an intermediate portion.

The communication hole 63d having the L-shaped section penetrates to the end surface of the third housing 63 on the input side and is connected to the fourth pneumatic chamber 64.

On the other hand, the input side of the groove 63c is connected to the communication groove 61e formed on the outer circumference of the first housing 61, and the output side thereof is connected to the third pneumatic chamber 41.

The third piston 13 is disposed in the recessed portion 63a of the third housing 63. The output rod 7 penetrating through the lid 3 on the input side through the through-hole 63b is disposed at the center portion of the third piston 13. The end portion of the output rod 7 on the output side is fixed to the third piston 13 in a screwed manner.

The output rod 7 is formed to have a length extending to the outer side of the lid 3 through the through-hole 63b of the third housing 63, the through-hole 50a (refer to FIGS. 7A and 7B) in the axial direction which is formed at the center of the first piston 11 and the rod portion 50, the through-hole of the lid 27, the through-hole of the lid 34, the through-hole in the axial direction which is formed at the center of the rod portion 58, and the through-hole of the lid 3.

The claw 76 is screwed to the front end of the output rod 7 on the input side with a bolt 76a.

In addition, the output rod 7 has, at the center, an inlet/outlet channel 7b on the input side, which extends in the axial direction from the front end on the input side to the position of the recessed portion 34d. The end portion of the inlet/outlet channel 7b on the output side is connected to the through-hole 7c penetrating through the output rod in the radial direction at the position of the recessed portion 34d. The recessed portion 34d of the lid 34 (the depth in the axial direction) is formed to have a depth larger than an operation range of the output rod 7 in the axial direction, and thereby the through-hole 7c is to be positioned in the recessed portion 34d all the time regardless of the position of the output rod 7.

A third inlet/outlet 8 is disposed on the end portion of the output rod 7 on the input side. The air supplied from the third inlet/outlet 8 is to be supplied to the first pneumatic chamber 21 via the recessed portion 34d through the inlet/outlet channel 7b and the through-hole 7c.

The disposition of the third piston 13 causes the recessed portion 63a of the third housing 63 to be partitioned, and the first hydraulic chamber 31 is formed on the input side.

The third piston 13 is provided with an oil supply hole for filling the first hydraulic chamber 31 with the oil. After the oil is injected, the oil supply hole is sealed by the oil filler plug 38.

In this configuration, the rod portion 50 slides on the inner circumferential surface of the through-hole 63b, and the output rod 7 is to slide on the inner circumferential surface of the through-hole of the rod portion 50. A space between the output rod 7 and the through-hole 63b is filled with the oil, and thereby the space configures a part of the first hydraulic chamber 31.

In addition, an O-ring (not illustrated) is disposed at an intermediate position of the sliding portion between the through-hole 50a of the rod portion 50 and the output rod 7 such that the oil of the first hydraulic chamber 31 does not leak out.

The rod portion 50 pressurizes the first hydraulic chamber 31 with the front end thereof pushing the oil in the through-hole 63b.

A retaining ring 37a is fixed with a plurality of bolts 37b to the end portion of the third housing 63 on the output side. The fixing of the retaining ring 37a is performed in a state in which the third piston 13 is disposed in the recessed portion 63a, is filled with the oil, and is sealed with the oil filler plug 38.

A recessed portion 13b and a recessed portion 37c are formed in surfaces of the third piston 13 and the retaining ring 37a which are opposite to each other, respectively, and the coil spring 36 that biases the third piston 13 to the input side is disposed in the recessed portions.

The second housing 62 configures, with the lid 39 and the lid 34, an input-side housing, and the first housing 61 and the third housing 63 configure, with the lid 27 and the retaining nut 37, an output-side housing.

In addition, the lid 34 and the lid 27 are fixed with the bolt 27a, and thereby the input-side housing is fixed to the input side (one end side) of the output-side housing.

Next, actuation performed by the cylinder device 1d of the fifth embodiment will be described.

Figure 8A:
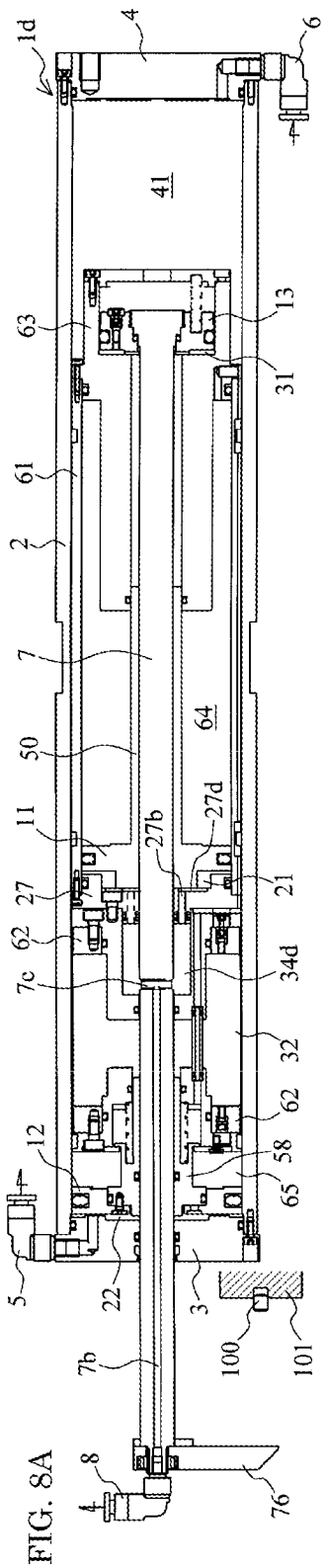
FIGS. 8A to 8C are views for illustrating an actuation state of the fifth embodiment.
Figure 8B:
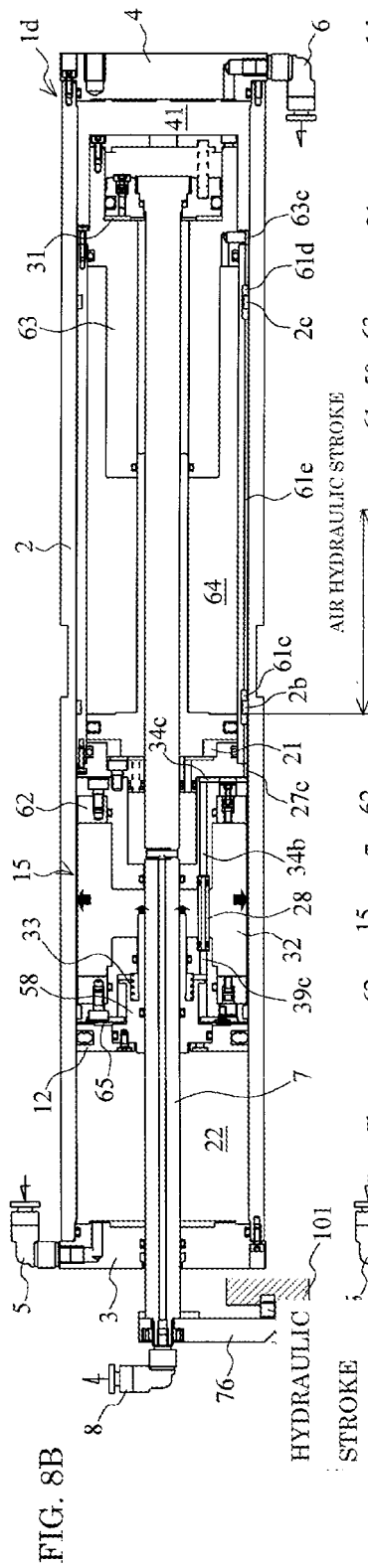
Figure 8C:
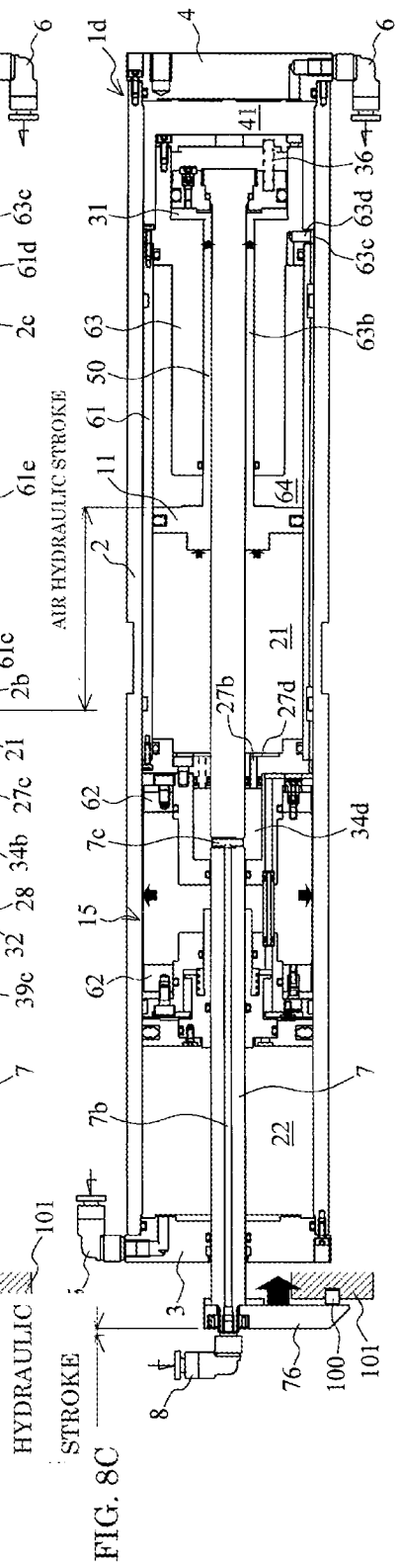

FIGS. 8A to 8C illustrate states of the actuation performed by the cylinder device 1d.

In the actuation, the claw 76 disposed at the front end of the output rod 7 abuts on the workpiece 100, and thereby fixing of the piston housings 60 (61, 62, and 63) is performed. Then, the amplified hydraulic pressure is output from the front end of the output rod 7 at any timing.

First, actuation of causing the cylinder device 1d to come into the initial state is described.

The initial state of the cylinder device 1d corresponds to a state illustrated in FIG. 8A in a state in which the piston housing 60 and the second piston 12 in the cylinder 2 move to the input side.

In order for the cylinder device 1d to come into the initial state illustrated in FIG. 8A, the air is supplied from the second inlet/outlet 6 with predetermined pressure in a state in which the first inlet/outlet 5 and the third inlet/outlet 8 are opened. The air supplied to the third pneumatic chamber 41 presses the end surface of the piston housing 60 on the output side which forms the third pneumatic chamber 41, and all of the piston housings start to move in the input direction. Simultaneously, the air supplied to the third pneumatic chamber 41 reaches the fifth pneumatic chamber 65 through the groove 63c, the recessed portion 61d, the communication groove 61e, the recessed portion 61c, the communication groove 27c, the communication groove 34c, the communication hole 34b, the collar 28, and the communication hole 39c (refer to FIGS. 6A and 6B). The air supplied to the fifth pneumatic chamber presses the end surface of the second piston 12 on the output side and the second piston 12 moves to the input side. At this time, since the first inlet/outlet 5 is opened, the second piston 12 and the rod portion 58 do not receive pneumatic pressure in the output direction by the second pneumatic chamber 22 and, thus, can easily move in the input direction.

In addition, since the flange 58c of the rod portion 58 engages with the retaining ring 29, all of the piston housings 60 also simultaneously move. Here, since the air supplied to the third pneumatic chamber 41 presses the end surface of the piston housing 60 on the output side, all of the piston housings 60 move to the input side. At this time, the internal pressure due to the air supplied to the fifth pneumatic chamber 65 also simultaneously presses the end surface of the piston housing 60 on the input side, and thereby the piston housing moves due to the bias of the coil spring 33 while the space of the fifth pneumatic chamber 65 is maintained as it is.

The air in the second pneumatic chamber 22 is discharged from the first inlet/outlet 5 in association with the movement to the input side.

In addition, the supplied air passes from the third pneumatic chamber 41 through the groove 63c and the communication hole 63d, and the pressure in the fourth pneumatic chamber 64 is increased. The first piston 11 moves to the input side until the first piston 11 abuts on the lid 27 due to the pressure from the fourth pneumatic chamber 64. At this time, the air in the first pneumatic chamber 21 is pushed by the first piston 11 and is released from the third inlet/outlet 8 through the communication groove 27d, the communication hole 27b, the recessed portion 34d, the through-hole 7c, and the inlet/outlet channel 7b.

The rod portion 50 moves to the input side along with the first piston 11, and thereby the pressure in the first hydraulic chamber 31 is reduced. Therefore, the output rod 7 and the third piston 13 are biased to the input side by the increase in pressure of the third pneumatic chamber 41 and the coil spring 36 and moves to the input side.

The output rod 7 and the third piston 13 move until the third piston 13 abuts on the bottom surface of the recessed portion 63a of the third housing 63.

The cylinder device 1d comes into the initial state illustrated in FIGS. 6A and 6B by the movement described above.

In the initial state illustrated in FIG. 8A, with the third inlet/outlet 8 opened, the second inlet/outlet 6 is opened and the air is supplied from the first inlet/outlet 5, and thereby the cylinder device comes into the state illustrated in FIGS. 6A and 6B.

In other words, the pressure of the second pneumatic chamber 22 is increased by the air supplied from the first inlet/outlet 5 and pushes the second piston 12 to the output side, and the second piston 12 presses the second hydraulic chamber 32 via the rod portion 58. At this time, since a reaction force of the pressing force to the output side does not act on all of the piston housings 60, the oil of the second hydraulic chamber 32 is not confined and the thin portion 15 is not elastically deformed. Therefore, the rod portion 58 presses the second hydraulic chamber 32, and thereby all of the piston housings 60 move to the output side. The coil spring 33 assists in pushing all of the piston housings 60 to the output side.

Since the third inlet/outlet 8 is opened, the pneumatic pressure of the first pneumatic chamber 21 is not increased. Therefore, the first piston 11 and the rod portion 50 are maintained to abut on the lid 27 without moving in the output direction. In addition, since the rod portion 50 does not move in the output direction, the hydraulic pressure in the first hydraulic chamber 31 is not increased, and the third piston 13 is also maintained to abut on the third housing 63.

As illustrated in FIGS. 6A and 6B, the third piston 13 move in the output direction along with the movement of the second piston 12 and the piston housing 60. In this manner, the output rod 7 moves in the output direction, and the claw 76 disposed on the front end of the output rod 7 abuts on the workpiece 100.

When the claw 76 of the output rod 7 abuts on the workpiece 100, the third piston 13 abuts on the third housing 63, and thus the movement of all of the piston housings 60 is stopped.

In this state, as illustrated in FIG. 8B, the air is further supplied from the first inlet/outlet 5. Since the movement of the piston housing 60 is stopped, the pressure in the second pneumatic chamber 22 is further increased and exceeds a bias force by the coil spring 33 in the input direction, and the second piston 12 and the rod portion 58 moves in the output direction.

The volume of the fifth pneumatic chamber 65 decreases due to the movement of the second piston 12; however, the air in the fifth pneumatic chamber 65 moves to the third pneumatic chamber 41 and is discharged from the second inlet/outlet 6. As illustrated in FIGS. 6A and 6B, a specific route of discharge is from the fifth pneumatic chamber 65 through the recessed portion 39d, the communication hole 39c, the collar 28, the communication hole 34b, the communication groove 34c, the communication groove 27c, the communication groove 61e, the groove 63c, and the third pneumatic chamber 41 to the second inlet/outlet 6.

The movement of the rod portion 58 causes the second hydraulic chamber 32 to be pressed by the front end portion of the rod portion 58 and the internal pressure is increased as illustrated by arrows in the axial direction in FIG. 8B. As illustrated by arrows in the radial direction, the hydraulic pressure causes the thin portion 15 to be elastically deformed to the outer side, and the piston housings 60 come into a state of being fixed to the cylinder 2 from a state in which the movement is stopped.

In the state in which the piston housing is not fixed by the thin portion 15, the piston housing 60 is in a state of being only stopped without moving.

In a non-fixed state (state in FIGS. 6A and 6B), when the supply of the air from the first inlet/outlet 5 is stopped and the air is supplied from the third inlet/outlet 8, all of the piston housings 60 moves in the reverse direction (input direction). In other words, the first piston 11 and the rod portion 50 move due to the pressure of the first pneumatic chamber 21 such that the hydraulic pressure in the first hydraulic chamber 31 is increased; however, since the output rod 7 is fixed to the workpiece 100 that abuts on the claw 76, all of the piston housings 60 moves in the reverse direction (input direction) due to the reaction force from the workpiece 100.

Regarding whether or not the piston housing 60 is fixed due to the elastic deformation of the thin portion 15, a strain gauge (not illustrated) is disposed on the outer circumference of the cylinder 2, deformation strain of the cylinder 2 due to the pressing force by the thin portion 15 to the cylinder 2 is detected, and the fixing of the piston housing 60 is determined by detecting a predetermined amount of strain. Otherwise, a pressure sensor (not illustrated) that detects pressure in the second hydraulic chamber 32 may be disposed, and determination may be performed by whether or not the pressure exceeds a predetermined value (value of the elastic deformation of the thin portion 15). A detection target by the pressure sensor may be the second pneumatic chamber 22. In addition, instead of the pressure sensor, a sensor that detects the movement of the output rod 7 or the claw 76 may be provided, and determination of fixing may be performed after a predetermined period of time (a period of time until the pressure of the second hydraulic chamber is increased and the thin portion 15 is elastically deformed) elapses from the stop of the movement.

In the state illustrated in FIG. 8B in which the piston housing 60 is fixed to the cylinder 2 due to the elastic deformation of the thin portion 15, the amplified thrust is not output from the front end of the output rod 7 only because the output rod 7 abuts on the workpiece 100.

With the air supply continuing from the first inlet/outlet 5 and the second inlet/outlet 6 opened, as illustrated in FIG. 8C, when the air is supplied from the third inlet/outlet 8 at a desired timing, the supplied air passes through the inlet/outlet channel 7b, the through-hole 7c, the recessed portion 34d, the communication hole 34d, and the communication hole 27b, and the communication groove 27d, and the pressure of the first pneumatic chamber 21 is increased.

The first piston 11 receives the pressure of the first pneumatic chamber 21, an air hydraulic mechanism causes the first piston 11 and the rod portion 50 to move in the output direction by an air hydraulic stroke as illustrated in FIG. 8C, and the front end of the rod portion 50 presses the first hydraulic chamber 31. In this manner, the third piston 13 receives the hydraulic pressure amplified in proportion to a ratio of an area of the front end of the rod portion 50 to an area of the end of the third piston 13, and the third piston 13, the output rod 7, and the claw 76 move in the output direction by an hydraulic stroke. During the movement, the hydraulic pressure amplified in the first hydraulic chamber 31 from the claw 76 presses the sectional area of the third piston 13 on the input side, and the amplified significant thrust is output to the claw 76. The claw 76 pulls the workpiece 100 in the direction of the lid 3 with the significant thrust, and thereby the workpiece 100 is pushed in the workpiece mounting stand 101.

As described above, according to the fifth embodiment, the third inlet/outlet 8 for generating the thrust from the claw 76 at the front end of the output rod 7 is provided, separately from the first inlet/outlet 5 for increasing the hydraulic pressure of the second hydraulic chamber 32 so as to fix the piston housing 60 to the cylinder 2.

In this manner, it is possible to perform the fixing actuation of the piston housing 60 independently from the thrust generating actuation from the claw 76 at the front end of output rod 7.

Sixth Embodiment

Hereinafter, the sixth embodiment will be described.

The third inlet/outlet 8 is disposed on the input side of the output rod 7 in the fifth embodiment. By comparison, the third inlet/outlet 8 is disposed on the output side of the output rod 7 in a cylinder device 1e of the sixth embodiment.

FIG. 9 illustrates a configuration of the cylinder device 1e in the sixth embodiment.

In the cylinder device 1e illustrated in FIG. 9, the same reference signs are assigned to the same portions as those of the cylinder device 1d of the fifth embodiment, and the description thereof is appropriately omitted.

As illustrated in FIG. 9, in the cylinder device 1e, the output rod 7 is formed to penetrate not only through the lid 3 but also through the lid 4. The lid 4 is provided with a through-hole in which the output rod 7 slides.

Similar to the fifth embodiment, the output rod 7 is provided with the through-hole 7c at a position in the recessed portion 34d in the operation range of the output rod 7. The output rod 7 is provided with an inlet/outlet channel 7d penetrating from the through-hole 7c to the end portion of the output rod 7 on the output side, and the third inlet/outlet 8 is disposed at the end portion of the output rod 7 on the output side.

The actuation by the cylinder device 1e is the same as that in the fifth embodiment except that the air flowing between the third inlet/outlet 8 and the first pneumatic chamber 21 passes through the inlet/outlet channel 7d.

According to the cylinder device 1e, since the third inlet/outlet 8 is not provided in the vicinity of the claw 76 as an application point of the amplified thrust, it is possible to increase a degree of the freedom on the periphery of the claw 76.

Seventh Embodiment

Hereinafter, the seventh embodiment will be described.

In the sixth embodiment, the third inlet/outlet 8 is provided on the output side of the output rod 7, and thereby the degree of the freedom on the periphery of the claw 76 is increased. By comparison, in the seventh embodiment, the cam mechanism is used similarly to the second embodiment and a rotation angle around the central axis of the claw 76 in association with the movement of the output rod 7 is changed, and thereby interference between the claw 76 and the workpiece or the like is avoided during the attachment and detachment of the workpiece or the like.

Figure 10:
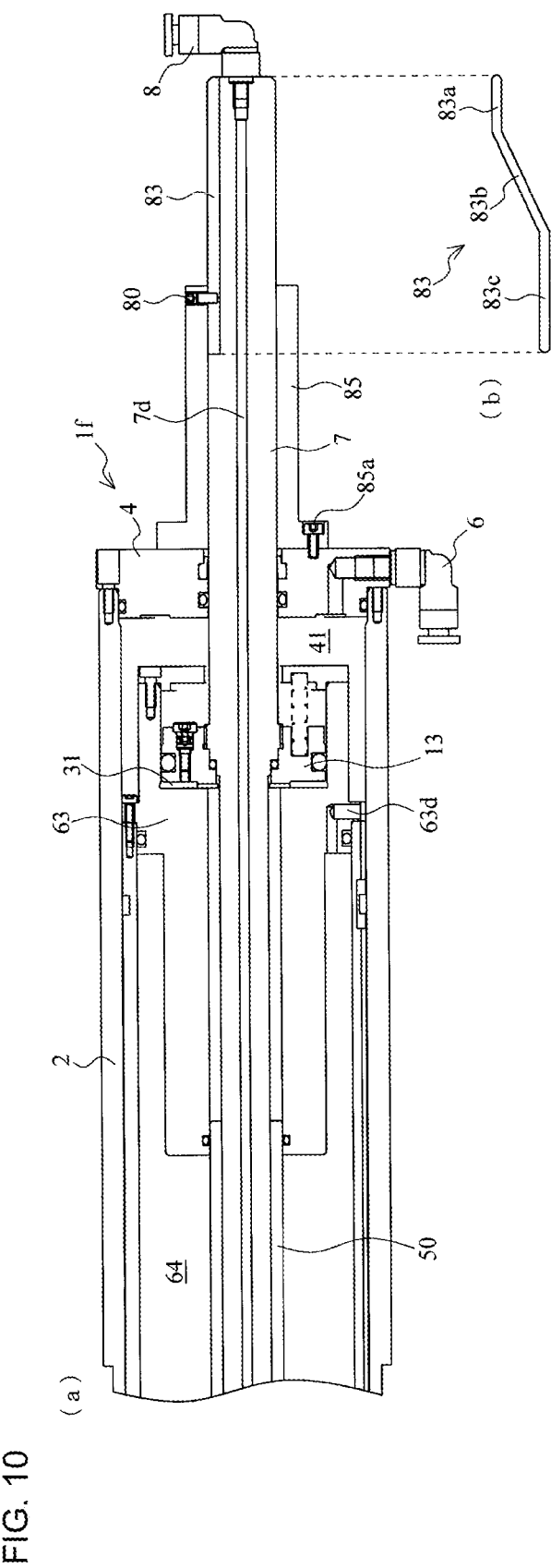
FIG. 10 is a view for illustrating a cylinder device of a seventh embodiment.

FIG. 10 illustrates a part of a configuration of a cylinder device 1f in the seventh embodiment.

In the cylinder device 1f illustrated in FIG. 10, the same reference signs are assigned to the same portions as those of the cylinder device 1d of the sixth embodiment, and the description thereof is appropriately omitted.

Similar to the description of FIGS. 3A and 3B, the groove plays a role of a guide of linear drive of the claw 76 in a case of a straight line as illustrated in FIG. 9. In addition, the guide groove 83 is illustrated to have a straight line shape according to the illustration; however, the guide groove 83 may be formed to have a helical shape in a region corresponding to a circling region such that the claw 76 can be driven to circle at an intermediate position of the guide groove.

The cylinder device 1f of the embodiment includes a circular cylindrical portion 85 that configures a part of the cam mechanism and on the inner side of which the output rod 7 slides. The circular cylindrical portion 85 is provided with a flange on the input side and the flange is fixed to the lid 4 with bolts 85a at a plurality of positions in the circumferential direction.

The circular cylindrical portion 85 is provided with a through-hole in the radial direction on the output side thereof. The cam pin 80 is inserted into the through-hole, and the circular cylindrical portion is fixed with a screw mechanism, for example.

The end portion of output rod 7 on the output side is provided with a guide groove 83 that configures a part of the cam mechanism. The front end of the cam pin 80 is fitted into (engages with) the guide groove 83.

A predetermined clearance (gap) is set between the end surface of the front end of the cam pin 80 and the bottom surface of the guide groove 83, and thereby an outer circumferential side surface of the cam pin 80 is to come into contact with the side surface of the guide groove 83 during sliding.

In order to illustrate the shape of the guide groove 83, FIG. 10B is a view illustrating a state of the guide groove 83 unfolded on a plane which corresponds to the front view of FIG. 10A.

The guide groove 83 includes a helical groove 83b for rotating the claw 76 with respect to the movement in the axial direction and linear grooves 83a and 83c formed to be connected to the end portions of the helical groove 83b on the output side and the input side.

In other words, in the guide groove 83, the helical groove 83b is formed to connect phase positions to each other in the circumferential direction which correspond to start and end positions of the rotation of the output rod 7 and the claw 76, the linear groove 83c is formed to extend in the axial direction from the end portion of the helical groove 83b on the input side further toward the input side (side of the lid 3, refer to FIGS. 6A and 6B), and the linear groove 83a is formed to extend in the axial direction from the end portion thereof on the output side further toward the output side (side of the third inlet/outlet 8). The linear groove 83c is formed such that the claw 76 pulls (pushes) the workpiece 100 in the axial direction.

As the output rod 7 and the claw 76 move from the initial state (input side) to the output side, the cam pin 80 slides on the guide groove 83 from the linear groove 80a, the helical groove 83b, and the linear groove 83c, in this order.

The cam mechanism of the embodiment is provided so as to avoid interference of the claw 76 with an object on the periphery of the workpiece or the like. Therefore, it is preferable that the linear groove 83a is formed to be as long as possible, in which the claw 76 linearly moves from the initial state while avoiding the interference, and the helical groove 83b is formed to be as short as possible, in which the claw 76 circles to the work position. The helical groove 83b may be positioned on the input side or on the output side as long as the claw 76 does not interfere with other parts or the like by circling.

The helical groove 83b of the guide groove 83 corresponds to rapid movement actuation of the output rod 7 due to the pneumatic pressure. The linear groove 83c corresponds to the rapid movement actuation of the output rod 7 due to the pneumatic pressure and corresponds to a stroke before and after the air hydraulic stroke due to the hydraulic pressure switched before the claw 76 abuts on the workpiece 100 or after the retaining nut 37 abuts on the lid 4.

Therefore, in the cylinder device 1f, after the claw 76 is actuated to circle by a predetermined length in a rapid movement portion of the output rod 7, the movement is switched to the linear movement so as to approach and grip the workpiece, and the abutting on the workpiece and the amplified thrust are output due to the pressing stroke.

The guide groove 83 is formed such that the cam mechanism of the embodiment causes the claw 76 to circle by 90 degrees; however, the guide groove may be formed to have any circling angle α (for example, 180 degrees or the like). In addition, the plurality of circular cylindrical portions 85 formed to have a different circling angle may be prepared and the circular cylindrical portions 85 may be appropriately changed according to types of workpieces.

The entire length of the guide groove 83 in the axial direction is longer than the operation range of the output rod 7 such that the guide pin 80 reaches the linear groove 83c before the claw 76 abuts on the workpiece.

In the initial state described in FIG. 8A, the linear groove 83a is formed such that the guide pin is positioned; however, it is also possible not to provide the linear groove 83a.

As described above, the embodiments of the invention are described; however, the configurations described in the embodiments may also be applied to the other embodiments to the extent of possibility.

For example, in the fifth embodiment, the strain gauge is disposed on the outer circumference of the cylinder 2, the deformation strain of the cylinder 2 due to the pressing force by the thin portion 15 to the cylinder 2 is detected, and the fixing of the piston housing 60 is determined; however, also similar to the first to fourth embodiments, the sixth embodiment, and the seventh embodiment, the strain gauge may be disposed and whether or not the piston housing 14 is fixed due to the elastic deformation of the thin portion 15 may be determined.

In addition, in the fifth to seventh embodiments described above, the case where the piston housing 60 is fixed to the cylinder 2 with the thin portion 15 of the second housing 62 is described; however, similar to the third embodiment described in FIGS. 5A to 5D, the piston housing 60 may be fixed to the cylinder 2 by the clamper.

In addition, also in the fifth to seventh embodiments, similar actuation described in FIGS. 2A to 2D, it is possible to form the recessed portion by the press working or the punching.

Also in the fifth to seventh embodiments, it is possible to achieve effects of the first to fourth embodiments described above.

What is claimed is:

1. A cylinder device comprising:
   a cylinder having a first end and second end; wherein a first inlet/outlet is located at the first end of the cylinder and a second inlet/outlet is located at the second end of the cylinder;
   a pneumatic chamber formed in the first end of the cylinder;
   a hydraulic chamber configured to move to the second end in the cylinder by means of pressure of the pneumatic chamber;
   a fixer configured to generate a force in a radial direction from a force in a thrust direction, which is applied to the hydraulic chamber by the pneumatic chamber, and fixing the hydraulic chamber in the cylinder due to the force in the radial direction;
   a hydraulic pressure amplifier that is provided on the second end in the cylinder and configured to amplify hydraulic pressure that is generated in the fixed hydraulic chamber by the pneumatic chamber; and
   an output rod that extends to an outside of the cylinder on the first end of the cylinder and configured to output the amplified hydraulic chamber to the first end of the cylinder by penetrating through the hydraulic pressure amplifier and the pneumatic chamber.

2. The cylinder device according to claim 1, wherein the hydraulic chamber is configured to generate hydraulic pressure by receiving a force in a direction to the second end of the cylinder, which is applied to the hydraulic chamber by the pneumatic chamber, and a force in a direction to the one of the end sides, which is applied to the hydraulic chamber by the output rod.

3. The cylinder device according to claim 1, wherein the hydraulic chamber includes a first hydraulic chamber provided with the output rod and a second hydraulic chamber provided with the fixer, wherein the fixer is configured to fix the second hydraulic chamber and the first hydraulic chamber by generating the force in the radial direction by means of hydraulic pressure of the second hydraulic chamber, and wherein the hydraulic pressure amplifier is configured to amplify hydraulic pressure generated in the first hydraulic chamber and output the hydraulic pressure to the output rod.

4. The cylinder device according to claim 3, wherein the fixer is configured to fix the second hydraulic chamber and the first hydraulic chamber by pressing, to an inner wall of the cylinder, a side wall of the second hydraulic chamber that is elastically deformed by the force in the radial direction.

5. The cylinder device according to claim 3, wherein the fixer is configured to generate the force in the radial direction by pressing, to a clamper, a taper member moving in a thrust direction by means of hydraulic pressure generated in the second hydraulic chamber, and fix the second hydraulic chamber and the first hydraulic chamber by pressing the clamper to an inner wall of the cylinder by the force.

6. The cylinder device according to claim 3, wherein the first hydraulic chamber includes an output piston configured to press the output rod in an output direction.

7. The cylinder device according to claim 6, wherein the output piston of the first hydraulic chamber configured to transmit only an output to the output rod without moving even in a state in which hydraulic pressure generated by being amplified in the first hydraulic chamber is applied to the output rod and thrust is output.

8. The cylinder device according to claim 3, wherein the pneumatic chamber includes a first pneumatic chamber having a first piston configured to pressurize the first hydraulic chamber, a second pneumatic chamber having a second piston configured to pressurize the second hydraulic chamber, and a communication hole through which the first pneumatic chamber communicates with the second pneumatic chamber, and wherein the first pneumatic chamber has the first inlet/outlet and is formed on a first end of the second pneumatic chamber.

9. The cylinder device according to claim 8, wherein the first piston causes the second pneumatic chamber, the first hydraulic chamber, and the second hydraulic chamber to move to the second end of the cylinder until the output rod abuts on a pressing target or until the first hydraulic chamber reaches an end portion on the second end of the cylinder to which the first hydraulic chamber is movable, with pressure of the first pneumatic chamber.

10. The cylinder device according to claim 9,
wherein a movement distance of the second piston measured when the second piston of the second hydraulic chamber generates hydraulic pressure amplified in the second hydraulic chamber is within a range of a length of an elastic deformation of a seal member of the second hydraulic chamber, which is disposed in the second piston.

11. The cylinder device according to claim 9,
wherein the first hydraulic chamber is formed on a second end of the second hydraulic chamber, and
wherein the first piston is formed up to the first hydraulic chamber by penetrating through the second pneumatic chamber and the second hydraulic chamber.

12. The cylinder device according to claim 9, further comprising:
a third pneumatic chamber that is provided on the second end of the cylinder and configured to press the hydraulic chamber to the first end of the cylinder.

13. The cylinder device according to claim 1, further comprising:
a rotation angle changer configured to change a rotation angle of the output rod around a central axis during movement of the output rod.

14. The cylinder device according to claim 13,
wherein the rotation angle changer is configured to change the rotation angle of the output rod by using a sliding mechanism having a protruding member and a groove that engages with the protruding member and formed in a moving direction of the output rod, the protruding member being formed on a first member of the output rod and a sliding surface opposite to the output rod, and the groove being formed on a second member of the output rod.

15. A press machine comprising:
the cylinder device according to claim 9;
a workpiece mounting member configured to mount a workpiece at a predetermined position with respect to the cylinder device;
a presser configured to press the mounted workpiece with a tool disposed on the output rod by driving the cylinder device; and
a detaching member configured to detach the pressed workpiece from the predetermined position.

16. A workpiece clamping apparatus comprising:
the cylinder device according to claim 12;
a workpiece mounting member configured to mount a workpiece at a predetermined position with respect to the cylinder device;
a pressing and clamping member configured to press and clamp the mounted workpiece with a tool disposed on the output rod by driving the cylinder device; and
a detaching member configured to detach the clamped workpiece from the predetermined position.

17. A cylinder device actuating method for actuating the cylinder device according to claim 12, the method comprising:
setting an initial state by causing the first hydraulic chamber and the second hydraulic chamber to move to the one end side by pressurizing the third pneumatic chamber from the second inlet/outlet and depressurizing the first pneumatic chamber and the second pneumatic chamber from the first inlet/outlet;
causing the output rod to abut on a pressing target or causing the first hydraulic chamber to reach the end portion on the second end of the cylinder to which the first hydraulic chamber is movable by causing the first pneumatic chamber and the second pneumatic chamber to move to the second end of the cylinder by pressurizing the first pneumatic chamber and the second pneumatic chamber from the first inlet/outlet and depressurizing the third pneumatic chamber from the second inlet/outlet;
actuating the fixer by further performing pressurization from the first inlet/outlet and fixing the first hydraulic chamber and the second hydraulic chamber to the cylinder;
actuating the hydraulic pressure amplifier by further performing pressurization from the first inlet/outlet and pressing the output rod to the pressing target; and
returning to an initial state by causing the first hydraulic chamber and the second hydraulic chamber to move to the second end of the cylinder by pressurizing the third pneumatic chamber from the second inlet/outlet and depressurizing the first pneumatic chamber and the second pneumatic chamber from the first inlet/outlet.

18. A method for clamping a workpiece at a predetermined position by actuating the cylinder device according to claim 12, the method comprising:
mounting the workpiece at the predetermined position;
driving the cylinder device and causing the cylinder device to move due to the pneumatic pressure of the first pneumatic chamber, until a tool disposed on the output rod abuts and stops on the workpiece or until the first hydraulic chamber reaches and stops on the end portion on the second end of the cylinder to which the first hydraulic chamber is movable;
fixing the first hydraulic chamber and the second hydraulic chamber by the fixer; and
amplifying hydraulic pressure of the first hydraulic chamber by the hydraulic pressure amplifier,
wherein amplifying hydraulic pressure of the first hydraulic chamber by the hydraulic pressure comprises clamping the workpiece at a predetermined position by pressing the workpiece due to hydraulic pressure with the tool disposed on the output rod due to the hydraulic pressure amplified.

19. A method for pressing a workpiece by actuating the press machine according to claim 15, the method comprising:
driving the cylinder device and returning a position of the output rod to an initial state;
mounting the workpiece at a predetermined position;
driving the cylinder device and causing the cylinder device to move due to the pressure of the first pneumatic chamber, until the tool disposed on the output rod abuts and stops on the workpiece or until the first hydraulic chamber reaches and stops on the end portion on the second end of the cylinder to which the first hydraulic chamber is movable;
fixing the first hydraulic chamber and the second hydraulic chamber by the fixer;
amplifying hydraulic pressure of the first hydraulic chamber by the hydraulic pressure amplifier, wherein amplifying hydraulic pressure of the first hydraulic chamber by the hydraulic pressure amplifier comprises pressing the workpiece due to hydraulic pressure with the tool disposed on the output rod, by means of the hydraulic pressure amplified, and pressing the workpiece;
driving the cylinder device and detaching the output rod and the tool disposed on the output rod from the workpiece by means of pneumatic pressure; and
detaching the completely pressed workpiece from the predetermined position.

20. The cylinder device according to claim 8,
wherein the pneumatic chamber is configured to include the first pneumatic chamber having the first piston configured to pressurize the first hydraulic chamber and the second pneumatic chamber having the second piston configured to pressurize the second hydraulic chamber,
wherein the second pneumatic chamber is disposed on a first end of the second hydraulic chamber,
wherein the first pneumatic chamber is disposed on a second end of the second hydraulic chamber, and
wherein the cylinder device further comprises:
the first inlet/outlet configured to pressurize the second pneumatic chamber; and
a third inlet/outlet configured to pressurize the first pneumatic chamber by penetrating through the second pneumatic chamber and the second hydraulic chamber.

21. The cylinder device according to claim 20,
wherein the output rod penetrates through the second pneumatic chamber and the second hydraulic chamber to the outside of the cylinder on the first end of the cylinder, and
wherein the third inlet/outlet configured to pressurize the first pneumatic chamber through a part in the output rod from a first end of the output rod.

22. The cylinder device according to claim 20,
wherein the output rod penetrates through the cylinder in an entire length of the cylinder from the outside thereof on the first end of the cylinder to the outside thereof on the second end of the cylinder, and
wherein the third inlet/outlet configured to pressurize the first pneumatic chamber through a part in the output rod from a second end of the output rod.

23. The cylinder device according to claim 20, further comprising:
an input-side housing provided with the second hydraulic chamber; and an output-side housing provided with the first pneumatic chamber and the first hydraulic chamber,
wherein the input-side housing is fixed to a first end of the output-side housing.

24. The cylinder device according to claim 23,
wherein the second piston is disposed between the input-side housing and the second pneumatic chamber, configured to make movement to the second end of the cylinder by means of pressure from the second pneumatic chamber, and has a rod portion configured to pressurize the second hydraulic chamber by means of the movement.

25. A cylinder device actuating method for actuating the cylinder device according to claim 24, the method comprising:
causing the second piston, the input-side housing, and the output-side housing to move to the second end of the cylinder by pressurizing the second pneumatic chamber from the first inlet/outlet;
stopping the movement of the input-side housing and the output-side housing by causing the output rod to abut on a pressing target;
actuating the fixer by further pressurizing the second hydraulic chamber from the first inlet/outlet so as to cause the second piston to move to the second end of the cylinder such that the rod portion pressurizes the second hydraulic chamber and fixing the input-side housing and the output-side housing to the cylinder; and
actuating the hydraulic pressure amplifier by pressurizing the first pneumatic chamber from the third inlet/outlet after the fixing and generating thrust by means of the hydraulic pressure amplified from a front end of the output rod.

* * * * *